(12) United States Patent
Shakirzyanov et al.

(10) Patent No.: US 9,459,926 B2
(45) Date of Patent: Oct. 4, 2016

(54) SYSTEM AND METHOD FOR MANAGING A COMPUTING CLUSTER

(75) Inventors: Bulat Shakirzyanov, Emeryville, CA (US); Keith A. Davidson, Sonoma, CA (US); Evan Cooke, Cambridge, CA (US); Jeffrey G. Lawson, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 877 days.

(21) Appl. No.: 13/467,766

(22) Filed: May 9, 2012

(65) Prior Publication Data

US 2012/0271926 A1 Oct. 25, 2012

Related U.S. Application Data

(63) Continuation-in-part of application No. 13/167,562, filed on Jun. 23, 2011.

(60) Provisional application No. 61/357,938, filed on Jun. 23, 2010.

(51) Int. Cl.
*G06F 9/50* (2006.01)
*H04L 29/08* (2006.01)
*H04Q 3/00* (2006.01)
*H04M 7/00* (2006.01)
*H04M 3/22* (2006.01)

(52) U.S. Cl.
CPC ......... *G06F 9/5072* (2013.01); *H04L 67/142* (2013.01); *G06F 2209/505* (2013.01); *H04L 29/08594* (2013.01); *H04M 3/22* (2013.01); *H04M 7/00* (2013.01); *H04Q 3/00* (2013.01)

(58) Field of Classification Search
CPC .......... H04L 29/08594; H04L 67/142; H04M 3/22; H04M 7/00; H04Q 3/00
See application file for complete search history.

(56) References Cited

U.S. PATENT DOCUMENTS

| | | | |
|---|---|---|---|
| 5,274,700 A | 12/1993 | Gechter et al. |
| 5,526,416 A | 6/1996 | Dezonno et al. |
| 5,581,608 A | 12/1996 | Jreij et al. |
| 5,598,457 A | 1/1997 | Foladare et al. |

(Continued)

FOREIGN PATENT DOCUMENTS

| | | | |
|---|---|---|---|
| DE | 1684587 A | 3/1971 |
| EP | 0282126 A | 9/1988 |

(Continued)

OTHER PUBLICATIONS

RFC 3986: Uniform Resource Identifier (URI): Generic Syntax; T. Berners-Lee, R. Fielding, L. Masinter; Jan. 2005; The Internet Society.

(Continued)

*Primary Examiner* — Tom Y Chang
(74) *Attorney, Agent, or Firm* — Jeffrey Schox

(57) ABSTRACT

A method and system for managing a computing cluster including hosting a plurality of machines in a networked computing cluster, wherein the plurality of machines include service instances running on hosts, where the services have configured machine state; and wherein machine state includes configuration data and software of the machine; integrating the plurality of machines of the cluster with at least one configuration controller component; and the at least one configuration controller component, altering the machine state of at least one service instance.

12 Claims, 23 Drawing Sheets

(56) References Cited

U.S. PATENT DOCUMENTS

| | | |
|---|---|---|
| 5,867,495 A | 2/1999 | Elliott et al. |
| 5,934,181 A | 8/1999 | Adamczewski |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Raesaenen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |

(56) References Cited

U.S. PATENT DOCUMENTS

| | | |
|---|---|---|
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,715,547 B2 | 5/2010 | Ibbotson et al. |
| 7,742,499 B1 | 6/2010 | Erskine et al. |
| 7,779,065 B2 | 8/2010 | Gupta et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 | 9/2011 | Raleigh |
| 8,024,785 B2 | 9/2011 | Andress et al. |
| 8,046,823 B1 | 10/2011 | Begen et al. |
| 8,069,096 B1 | 11/2011 | Ballaro et al. |
| 8,081,958 B2 | 12/2011 | Soederstroem et al. |
| 8,103,725 B2 | 1/2012 | Gupta et al. |
| 8,126,128 B1 | 2/2012 | Hicks, Iii et al. |
| 8,139,730 B2 | 3/2012 | Palma et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,315,198 B2 | 11/2012 | Corneille et al. |
| 8,319,816 B1 | 11/2012 | Swanson et al. |
| 8,326,805 B1 | 12/2012 | Arous et al. |
| 8,346,630 B1 | 1/2013 | McKeown |
| 8,355,394 B2 | 1/2013 | Taylor et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,565,117 B2 | 10/2013 | Hilt et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,649,268 B2 | 2/2014 | Lawson et al. |
| 8,667,056 B1 | 3/2014 | Proulx et al. |
| 8,675,493 B2 | 3/2014 | Buddhikot et al. |
| 8,695,077 B1 | 4/2014 | Gerhard et al. |
| 8,755,376 B2 | 6/2014 | Lawson et al. |
| 8,767,925 B2 | 7/2014 | Sureka et al. |
| 8,806,024 B1 | 8/2014 | Francis et al. |
| 8,837,465 B2 | 9/2014 | Lawson et al. |
| 8,838,707 B2 | 9/2014 | Lawson et al. |
| 8,861,510 B1 | 10/2014 | Fritz |
| 8,879,547 B2 | 11/2014 | Maes |
| 8,938,053 B2 | 1/2015 | Cooke et al. |
| 8,948,356 B2 | 2/2015 | Nowack et al. |
| 8,964,726 B2 | 2/2015 | Lawson et al. |
| 9,014,664 B2 | 4/2015 | Kim et al. |
| 9,015,702 B2 | 4/2015 | Bhat |
| 9,344,573 B2 | 5/2016 | Wolthuis et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0198941 A1 | 12/2002 | Gavrilescu et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0195990 A1 | 10/2003 | Greenblat |
| 2003/0196076 A1 | 10/2003 | Zabarski et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0165569 A1 | 8/2004 | Sweatman et al. |
| 2004/0172482 A1 | 9/2004 | Weissman et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0218748 A1 | 11/2004 | Fisher |
| 2004/0228469 A1 | 11/2004 | Andrews et al. |
| 2004/0240649 A1 | 12/2004 | Goel |
| 2005/0005200 A1* | 1/2005 | Matena et al. ............... 714/38 |
| 2005/0010483 A1 | 1/2005 | Ling |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | DeHamer et al. |
| 2005/0091572 A1 | 4/2005 | Gavrilescu et al. |
| 2005/0125251 A1 | 6/2005 | Berger et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008073 A1 | 1/2006 | Yoshizawa et al. |
| 2006/0015467 A1 | 1/2006 | Morken et al. |
| 2006/0021004 A1 | 1/2006 | Moran et al. |

(56) References Cited

U.S. PATENT DOCUMENTS

| | | |
|---|---|---|
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0050306 A1 | 3/2007 | Mcqueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1* | 1/2008 | Overton et al. ............ 709/218 |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1* | 9/2009 | Forsberg et al. ............ 370/401 |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276771 A1* | 11/2009 | Nickolov et al. ............ 717/177 |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0037204 A1 | 2/2010 | Lin et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0312919 A1 | 12/2010 | Lee et al. |
| 2010/0332852 A1 | 12/2010 | Vembu et al. |

(56) References Cited

U.S. PATENT DOCUMENTS

| | | |
|---|---|---|
| 2011/0026516 A1 | 2/2011 | Roberts et al. |
| 2011/0029882 A1 | 2/2011 | Jaisinghani |
| 2011/0029981 A1* | 2/2011 | Jaisinghani ............ H04L 41/12 718/104 |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1* | 6/2011 | Mori ............................ 709/217 |
| 2011/0143714 A1 | 6/2011 | Keast et al. |
| 2011/0145049 A1 | 6/2011 | Hertel et al. |
| 2011/0151884 A1 | 6/2011 | Zhao |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1* | 10/2011 | Jasper ................. H04M 3/5237 379/112.1 |
| 2011/0258432 A1 | 10/2011 | Rao et al. |
| 2011/0265168 A1 | 10/2011 | Lucovsky et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1* | 11/2012 | Ji et al. ............................ 726/11 |
| 2012/0316809 A1 | 12/2012 | Egolf et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0036476 A1 | 2/2013 | Roever et al. |
| 2013/0047232 A1 | 2/2013 | Tuchman et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0365480 A1 | 12/2015 | Soto et al. |

FOREIGN PATENT DOCUMENTS

| | | |
|---|---|---|
| EP | 1464418 A | 10/2004 |
| EP | 1522922 A2 | 4/2005 |
| EP | 2053869 A1 | 4/2009 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 02087804 | 11/2002 |
| WO | 2006037492 A | 4/2006 |
| WO | 2009018489 A | 2/2009 |
| WO | 2009124223 A | 10/2009 |
| WO | 2010037064 A | 4/2010 |

(56) References Cited

FOREIGN PATENT DOCUMENTS

| WO | 2010040010 A | 4/2010 |
|---|---|---|
| WO | 2010101935 A | 9/2010 |
| WO | 2011091085 A | 7/2011 |

OTHER PUBLICATIONS

Complaint for Patent Infringement, *Telinit Technologies, LLC* v. *Twilio Inc.*, dated Oct. 12, 2012.

NPL, "API Monetization Platform", 2013.

"Ethernet to Token ring Bridge"—Black Box Corporation, Oct. 1999 http://blackboxcanada.com/resource/files/productdetails/17044.pdf.

Kim et al. "In-service Feedback QoE Framework" 2010 Third International Conference on Communication Theory. Reliability and Quality of Service. pp. 135-138. 2010.

Matos et al. "Quality of Experience-based Routing in Multi-Service Wireless Mesh Networks" Realizing Advanced Video Optimized Wireless Networks. IEEE. pp. 7060-7065. 2012.

S. barakovic and L. Skorin-Kapov. "Survey and Challenges of QoE Management Issues in Wireless Networks". 2012, pp. 1-29.

Subramanya, et al. "Digital Signatures", IEEE Potentials, Mar./Apr. 2006, pp. 5-8.

Tran et al. "User to User adaptive routing based on QoE" ICNS 2011: The Seventh International Conference on Networking and Services. pp. 170-177. 2011.

Wu et al. "Quality Evaluation in Peer-to-Peer IPTV Services" Data Traffic and Monitoring Analysis, LNCS 7754. pp. 302-319. 2013.

\* cited by examiner

```xml
<!-- Frondend -->
<HostGroup count="5">
      <InstanceSize>c1.medium</InstanceSize>
      <Roles>
            <Role>frontend</Role>
      </Roles>
      <RequiresRunningRoles>
            <Role>db-master</Role>
            <Role>app-server</Role>
      </RequiresRunningRoles>
</HostGroup>

<!-- App Servers -->
<HostGroup count="2">
      <InstanceSize>m1.large</InstanceSize>
      <Roles>
            <Role>app-server</Role>
      </Roles>
      <RequiresRunningRoles>
            <Role>db-master</Role>
      </RequiresRunningRoles>
</HostGroup>

<!-- DB -->
<HostGroup count="1">
      <InstanceSize>m2.xlarge</InstanceSize>
      <Roles>
            <Role>db-master</Role>
      </Roles>
</HostGroup>
```

FIGURE 11

```
curl http://boxconfig.dev.twilio.com/api/hosts?status=running |
xsltproc iptables.xslt > iptables.conf
```

FIGURE 15

SYSTEM AND METHOD FOR MANAGING A COMPUTING CLUSTER

CROSS-REFERENCE TO RELATED APPLICATIONS

This application is a continuation-in-part of U.S. patent application Ser. No. 13/167,562, entitled "System and Method for Managing a Computer Cluster" and filed on 23 Jun. 2011, which claims priority to U.S. Provisional Application No. 61/357,938, filed 23 Jun. 2010, titled "SYSTEM AND METHOD FOR MANAGING A PLURALITY OF HOSTS" which is incorporated herein by this reference in its entirety.

TECHNICAL FIELD

This invention relates generally to the cloud-computing field, and more specifically to a new and useful method and system for managing a computing cluster in the cloud-computing field.

BACKGROUND

There are increasingly more and more cloud-based services and platforms. While the use of cloud computing has been influential in allowing new products to be developed and built, management of a computing cluster on which the service or platform runs is still a challenge. Each machine or device in the computing cluster typically has its configuration set individually. However, changes in other machines can impact how one might configure a particular machine, and synthesizing such information is not easily accomplished. Thus, there is a need in the cloud-computing field to create a new and useful method and system for managing a computing cluster. This invention provides such a new and useful method and system.

BRIEF DESCRIPTION OF THE FIGURES

FIG. 11 is a an exemplary configuration file for the computing cluster;

FIG. 15 is an example API command from a user to generate a firewall rule set allowing access to running hosts in the cloud.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method of a First Embodiment for Managing a Computer Cluster

Figure 1:
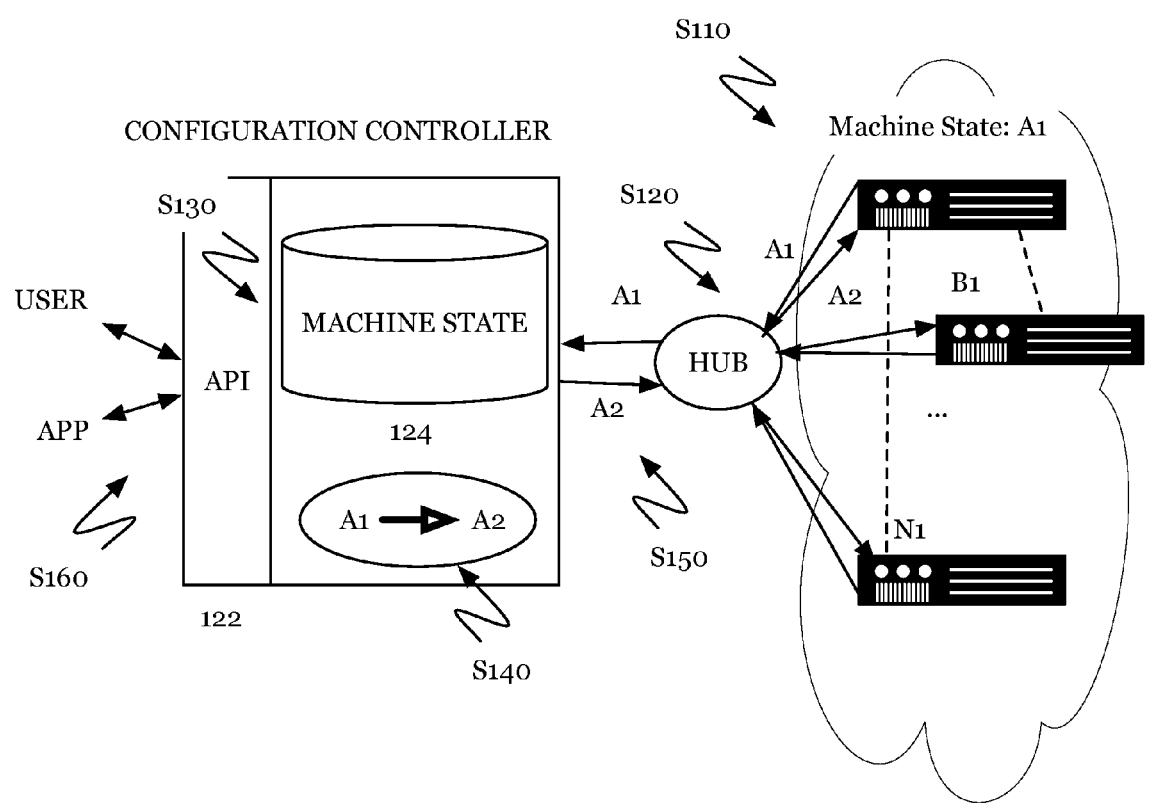
FIG. 1 is a schematic representation of a method of a preferred embodiment.

As shown in FIG. 1 a method for managing a computer cluster of a preferred embodiment includes hosting a plurality of machines in a networked computing cluster S110, connecting the plurality of machines of the cluster to a configuration controller S120, the configuration controller storing individual machine state for the plurality of machines S130, determining a new machine state from the state of the plurality of machines S140; and updating a machine in the computing cluster with the new machine state S150. The method functions to create an interface for easy monitoring, configuration, and/or orchestration of a computing cloud. More preferably, the method enables a machine to be reconfigured based on changes in other related machines in the cloud, not just changes for that particular machine. The method is preferably implemented in a system substantially similar to the one described below but may be implemented by any suitable system. In one preferred embodiment, the method is used with a computing cluster for a telephony platform, but the computing cluster may alternatively be for any suitable application. The machines are preferably managed and operated but may alternatively be part of a third party system(s) that are simply controlled through a configuration controller. The method preferably includes pushing new machine state to a machine. These steps preferably implement a publishing and subscribing model of communication, which functions to provide real-time control over the computing cluster.

Step S110, which includes hosting a plurality of machines in a networked computing cluster, functions to operate a plurality of devices or hosts that require orchestration. The computing cluster is preferably an Internet based plurality of machines (i.e., hosts), but may alternatively be an internally networked plurality of machines. The machines preferably provide computing and/or storage capabilities. A machine is preferably a server but may alternatively be any suitable dedicated device or virtual device. A machine may alternatively be a virtual machine wherein a single device facilitates running a plurality of virtual machines. A machine is preferably configured with machine state to perform a particular task. In one preferred embodiment the computing cluster is used for a telephony platform. For a telephony platform, the plurality of machines is preferably composed of call routers, load balancers, call queues, media processors, message routing devices, resource databases, and/or any additional devices. The machines may alternatively be setup for any suitable type of computing cluster. The networked computer cluster is preferably hosted by the entity administering the method, but the computer cluster may alternatively be hosted on a third party platform, or the whole of the computer cluster may alternatively be distributed over a plurality of platforms or computing clusters. The entity administering the method preferably has some level of operational control of the machines composing the computing cluster, either directly, an API of third party service, or any suitable control mechanism.

Figure 2:
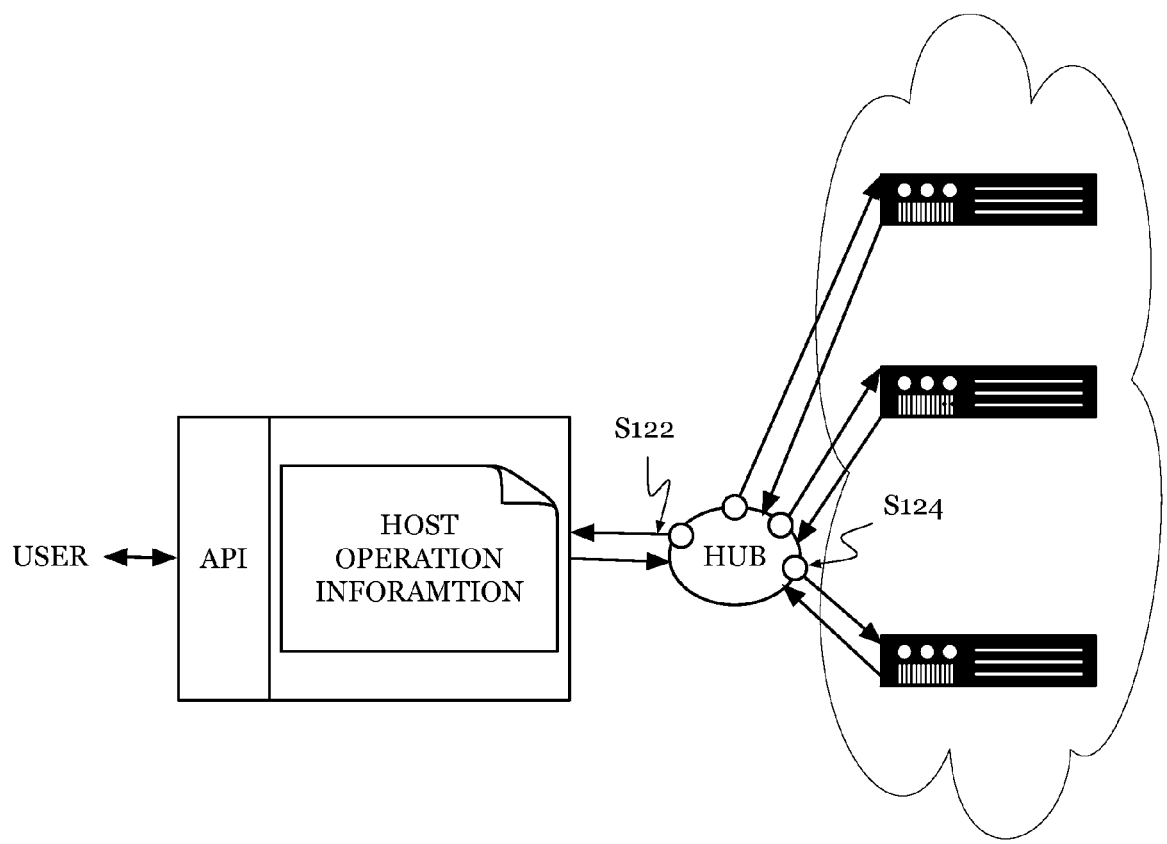
FIG. 2 is a schematic representation of a variation with publication/subscription communication of a preferred embodiment.
Figure 3:
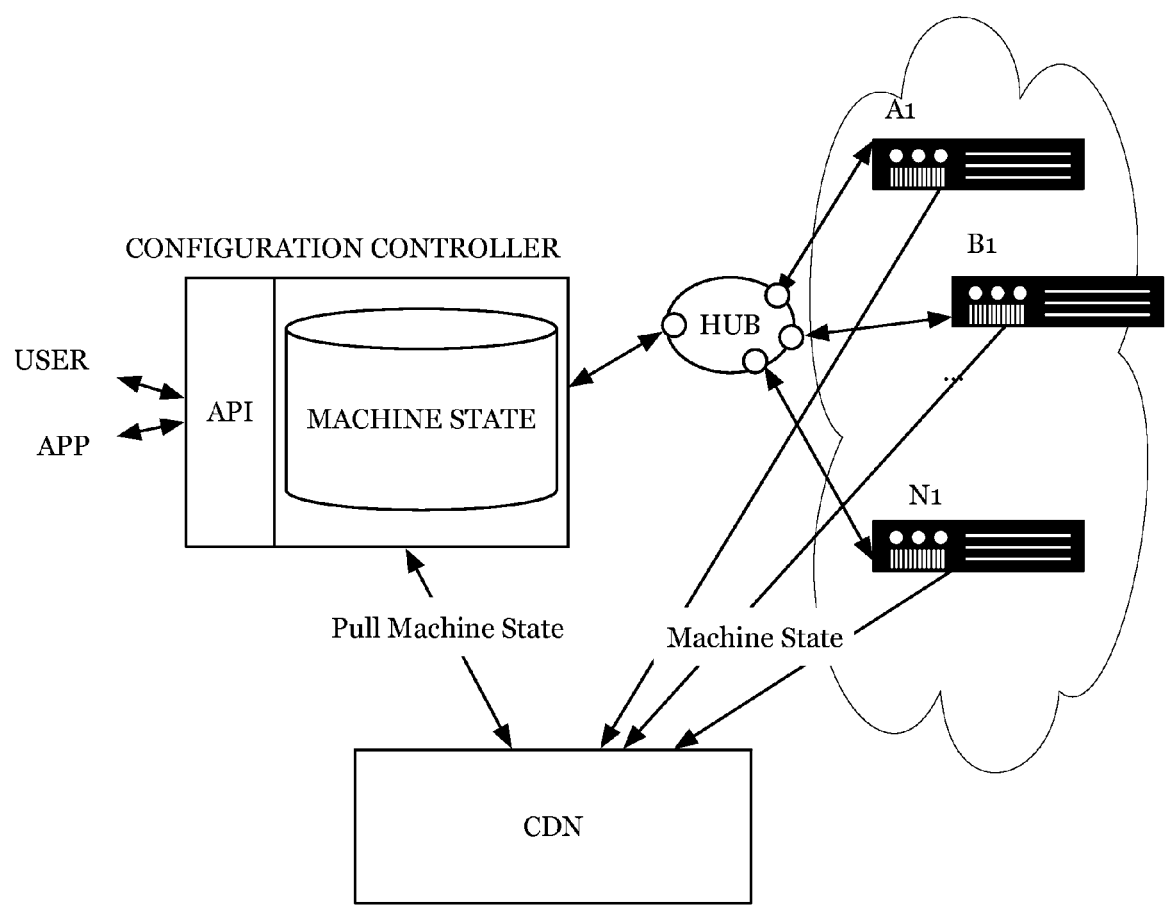
FIG. 3 is a schematic representation of a variation with content delivery network communication of a preferred embodiment.

Step S120, which includes connecting the plurality of machines of the cluster to a configuration controller, functions to create channels to send and receive messages between a central device (e.g., a configuration controller) and the devices making up a computing cluster infrastructure. The communication channels are preferably implemented through a pubsub infrastructure as shown in FIG. 2, but any suitable communication system may alternatively be used. As part of the pubsub infrastructure, Step S120 preferably includes subscribing to notifications of a plurality of machines S122 and receiving subscription requests from a plurality of machines S124. External or internal hub(s) may be used as a message broker for relaying published messaged to those who have a subscription. By subscribing to notifications of a machine, the configuration controller preferably receives operation information as the information is changed. A machine may have information actively requested from it. S122 may alternatively occur automatically, without receiving an instruction requesting the information. S122 preferably occurs whenever machine state (or operation) changes. For example, when the status of a machine changes such as due to an error, the machine preferably publishes the information, and the hub routes the information to the configuration controller because of the subscription to the machine. The configuration controller preferably maintains an updated database of machine state through such subscriptions as described in Step S130. Step S124 preferably functions to establish individual subscriptions of a machine to messages generated by the configuration controller. The configuration controller can preferably selectively publish messages to any suitable subset of the plurality of machines that have a subscription. This may be accomplished in a variety of ways. A machine may have a plurality of types of subscriptions, such as one subscription unique to messages for that machine, a subscription to messages directed to machines with a particular status, a subscription to messages directed to machines with a particular role, and/or any suitable subscription type. The subscriptions may alternatively be targeted through publication filtering. A subscription by the machine to the configuration controller preferably includes machine state. Information such as IP address (or any suitable identifier), role, status, or other operation information may additionally be communicated to the configuration controller. The machine state data of the configuration controller may be used to selectively publish information to hosts. For example, a plurality of machines may have individual subscriptions to the messages of a configuration controller. At some point in time, the configuration controller may only want to send a message to machines that have the role of a load balancer. The message is preferably only published to machines that have the role of a load balancer by filtering where the message is published. During communication data may be encrypted with a shared secret. A secret key or cryptographic code can be used to uniquely verifies communication between a machine and a configuration controller. The secret key is preferably supplied at boot time of the machine but may alternatively be established at any suitable time. The secret key is preferably included in communications between a host and the cloud manager or used to sign a communication. Any suitable authorization or security measures may alternatively be used. Other forms of communication may alternatively be used. In one variation, a content delivery network system is used as an intermediary for machine state sharing. Machines preferably post machine state to the content delivery network (CDN), and the configuration controller preferably pulls the machine state information from the CDN as shown in FIG. 3.

Figure 4A:
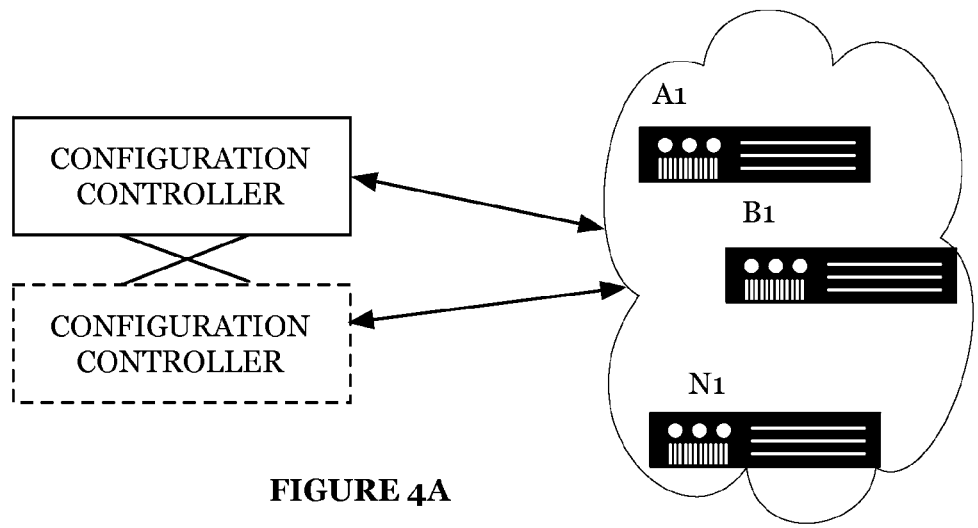
FIGS. 4A-4C are schematic representations of configuration controller architectures.
Figure 4B:
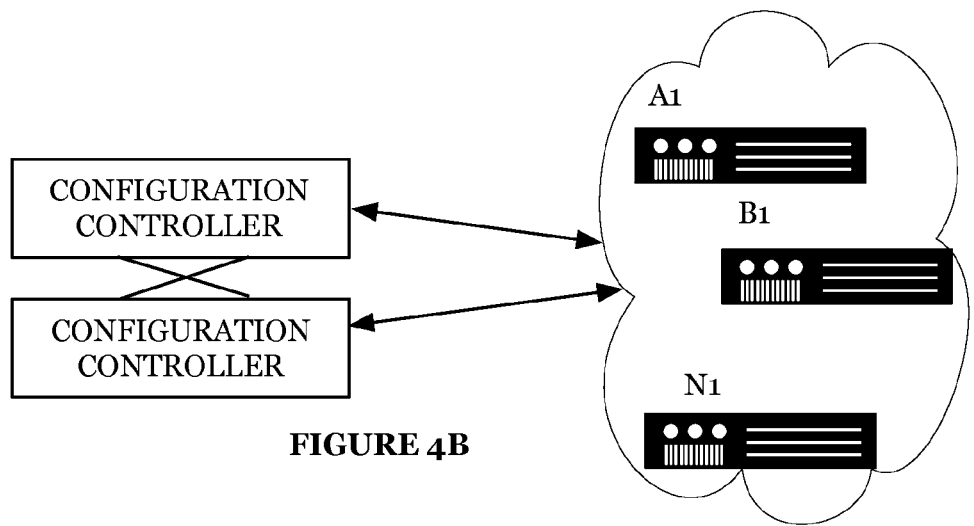
Figure 4C:
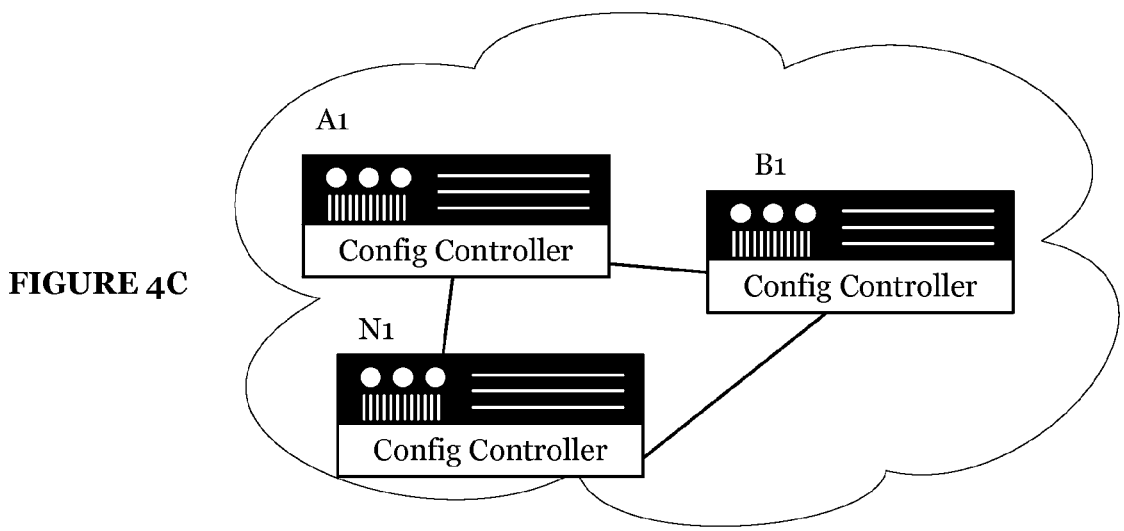

The configuration controller may have several variations of infrastructure. One preferred variation includes a single configuration controller machine integrated with the plurality of machines. A plurality of configuration controllers may additionally be used. In one variation, the configuration controller is implemented in an active-passive configuration as shown in FIG. 4A. In an active-passive configuration, one machine preferably acts as a primary configuration controller, and a second configuration controller preferably acts as a secondary configuration controller that can be used when needed. In yet another variation, the configuration controller is implemented in an active-active configuration as shown in FIG. 4B. In an active-active configuration there are a plurality of configuration controllers cooperatively managing the cluster. Machine state is preferably stored in a shared resource in this variation. In yet another variation, the machines of the cluster cooperatively function as the configuration controller in a peer-to-peer type configuration as shown in FIG. 4C. In this variation, a configuration controller service preferably runs on each machine. The configuration controller may alternatively have any suitable architecture and implementation.

Step S130, which includes the configuration controller storing individual machine state for the plurality of machines, functions to store state information for machines of the computing cluster. The configuration controller is preferably a device or platform from which computing cluster orchestration may be carried out. The configuration controller may itself be distributively hosted. Machine state of a machine preferably includes configuration data and software. The machine state may additionally include operational data. The operational data may be external to the machine. The configuration data is preferably similar to file system related data. The software is preferably the code or source code executed by the machine. The operational data is resources such as a database, media resources, persistent data, or any suitable data used in operation. The machine state may alternatively include any suitable combination of the configuration data, software, operational data, and/or other machine related data. The machines preferably publish changes in machine state to the configuration controller. Alternatively, the configuration controller may periodically poll the machines. In yet another alternative, the configuration controller pulls machine state from a CDN. The machine state is preferably stored in a database. The machine state database 124 may be any suitable database or device for storing data such as a mySQL database, JSON, or an XML file. The machine state database preferably stores a record for each machine including the machine state. This information may include internal and/or external IP addresses of the machines, status, role(s), capacity/load, and/or any suitable operation information. As discussed further below, the database may additionally store a security key for each machine to securely identify a machine. Current machine state is preferably stored, and additionally, past machine state may be stored as a version history of the machines. The version history is preferably the machine state from different points in time. These versions may be used in comparing the machine state from different times or from different machines and resolving problems.

Step S140, which includes determining a new machine state from the state of the plurality of machines, functions to calculate a next state for a machine based on overall state of the cluster. A new machine state is preferably calculated based on the current machine state. The new machine state is additionally or alternatively calculated based on the machine state of associated machines of the computing cluster. The associated machines are preferably machines that interact directly or indirectly with the machine. Machines may alternatively be associated based on shared machine state (e.g., having the same role or status). For example, two machines that are configured as indicated in the machine state to be load balancers may be associated with each other. Calculating a new machine state based on the machine state of at least a second machine enables the machines to be updated more intelligently. Additionally, a plurality of new machine states may be calculated for a plurality of machines. A new machine state may be any suitable change to a machine state. The configuration data may be changed. The software may change which may be an update to a new version of software or change in role. The operational data may change, such as changes in a database resource of a machine. In some variations, the new machine state may be a defined as provisioning a new machine to scale the computing cluster, reprovisioning a machine to a new role, restarting a machine, or deprovisioning a machine to scale down.

Figure 5:
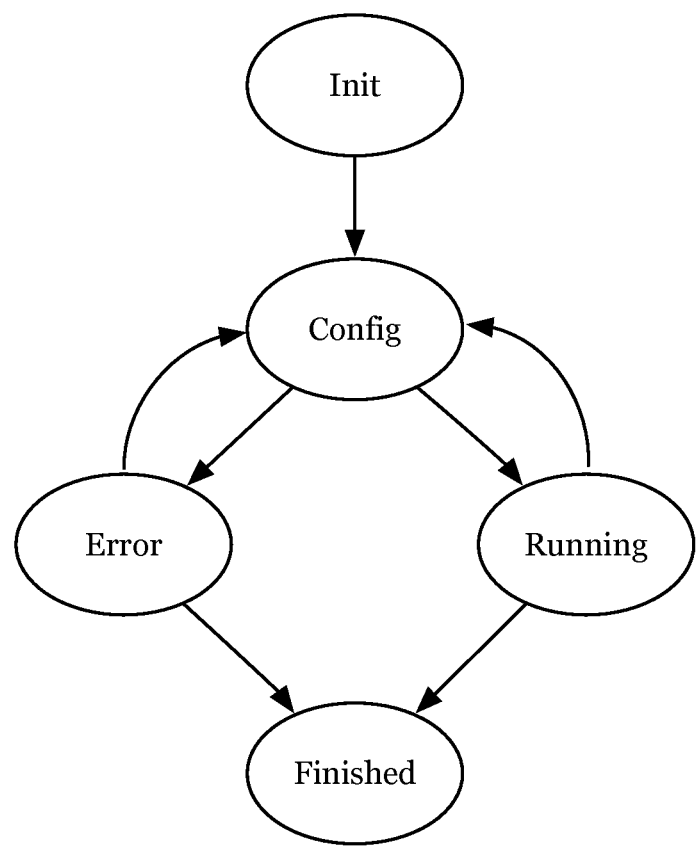
FIG. 5 is a schematic representation of a finite state machine model processed by a configuration controller of a preferred embodiment.

The calculation of a new machine state is preferably initiated by a change in the computing cluster. In one variation, calculation of a new machine state is due to the change in machine state as a result of operation. For example, if a machine encounters an error, then new machine states are preferably calculated for other machines to accommodate for the down machine. This may include provisioning a new machine with a previous machine state of the down machine, or could alternatively be a redistribution of the machines responsibilities to other machines. This transfer of responsibilities is preferably conveyed through the new machine states. Similarly the calculation of a new machine state may be due to the usage and/or capacity of the machine. Load and capacity may be communicated through the configuration data in the machine state. In another variation, calculation of a new machine state is due to outside initiation. The configuration controller preferably includes an API, which may be used by an outside system or operator. An operator may issue instructions to change elements of the computing cluster. For example, an instruction may be set to scale particular resources up or down, to update software, to change operational data, or perform any suitable orchestration instruction. The calculation of new machine state may alternatively or additionally be calculated using auto-provisioning, self healing and/or any suitable algorithm. A finite state machine may be run to determine the new machine state of a particular machine as shown in FIG. 5.

Figure 6:
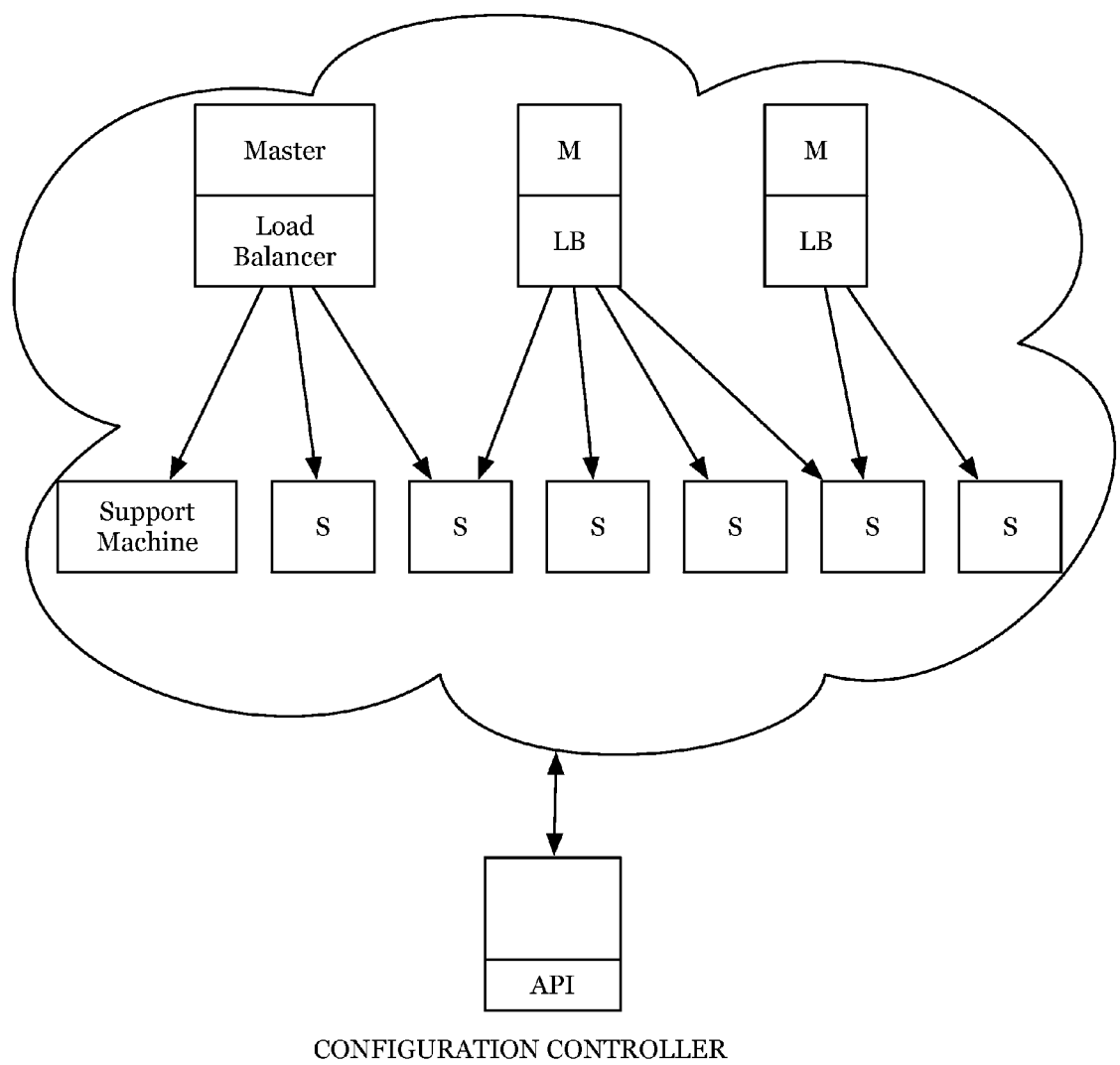
FIG. 6 is a detailed schematic representation of computing cluster including a master device and a load balancer.
Figure 7:
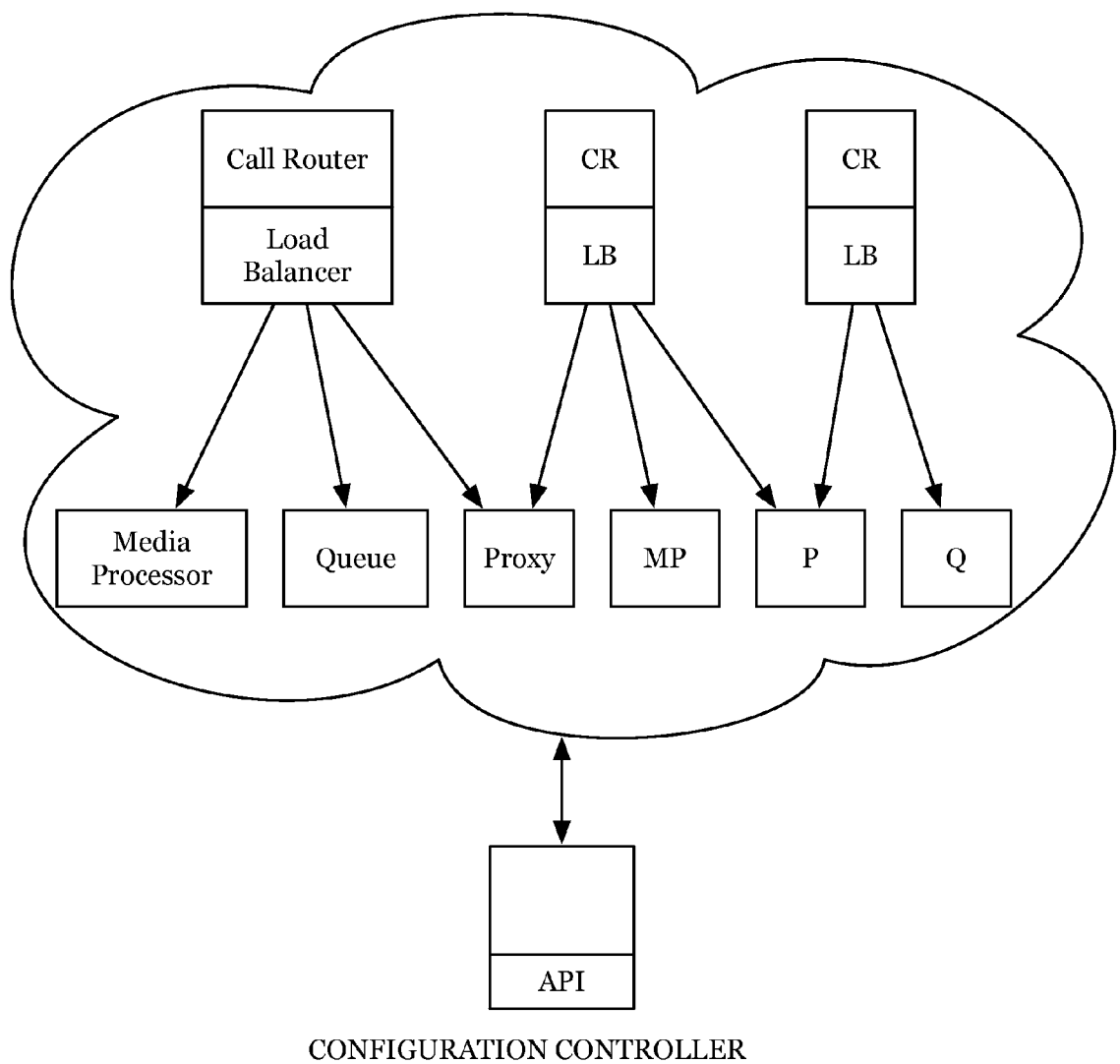
FIG. 7 is a detailed schematic representation of telephony computing cluster of a preferred embodiment.

In one variation, the machines of the computing cluster include a plurality master devices each with a dedicated load balancers as shown in FIG. 6. Having a plurality of masters and load balancers distributes responsibility and creates a more scalable computing cluster. The master device preferably provides high-level services but may serve any suitable service. In a preferred embodiment where the computing cluster is a telephony platform, the master device is preferably a call router as shoen in FIG. 7. The dependent machines may be any suitable support of load balanced machines such as media processors, caches, queues, proxy servers, or any suitable machines. The dependent machines (i.e., machines managed by each load balancer) are preferably conveyed in the machine state of the load balancer. Load balancers may be configured with new machine state based on changes in the machines for which they provide load balancing. Provisioning of a machine (e.g., provisioning a new machine, deallocating a machine, etc.) that is load balanced by a particular load balancer preferably causes a recalculation of machine state for at least one load balancer. When the load balancer is updated with the new machine state the load balancer and master device may be restarted to start load balancer of the changed dependent machines.

Step S150, which includes updating a machine in the computing cluster with the new machine state, functions to set the machine to the new machine state. The new machine state is preferably communicated to the machine through the established channels of communication. The new machine state is preferably published through a hub and distributed to machines that have the appropriate subscription established in Step S124. Publications may be filtered which functions to direct the new machine state to the appropriate machine(s). As discussed above, a new machine state can preferably be selectively published (or filtered) based on any suitable machine characteristic such as IP address (or ID), status, role, capacity/load and/or any suitable aspect. Once new machine state is received at the machine, the machine may require being restarted to initialize the new machine state. Alternatively, the new machine state may be initialized during run time.

Additionally a method of the preferred embodiment includes the step of receiving a message through an API of the configuration controller S160, which functions to allow outside instructions for management of the computing cluster. The API is preferably a convenient interface for users or systems to access and change the computing cluster system.

The API is preferably a RESTful API but may alternatively be any suitable API such as SOAP. Additionally, a user interface may be used as a front end control providing an alternate way for users to interact with the configuration controller through the API. The API is preferably used to alter configuration of a machine or machines. A user and/or an outside system may issue API calls. The API may additionally be used to access information about the computing cluster. The configuration controller, through the communication channels established in S120, preferably has stored and updated information about the machines. Additionally or alternatively the configuration controller may communicate with a machine requesting information. For example, an HTTP GET message using a common HTTP client tools such as curl, piped into an extensible stylesheet language transformation (XSLT) processor, can be used to generate any suitable type of configuration file. The command shown in FIG. 15, could be used with a suitable XSLT file to generate a firewall ruleset allowing access to only running hosts in the cloud. The API may alternatively be used for transferring data, allocating or reprovisioning resources, and/or any suitable cloud computing management. Additionally, a change to one machine may cause the determination of new machine state of a second machine. For example, allocating a new device may require the determination of a new machine state for a load balancer.

2. Method of a Second Embodiment for Managing a Computer Cluster

Figure 8:
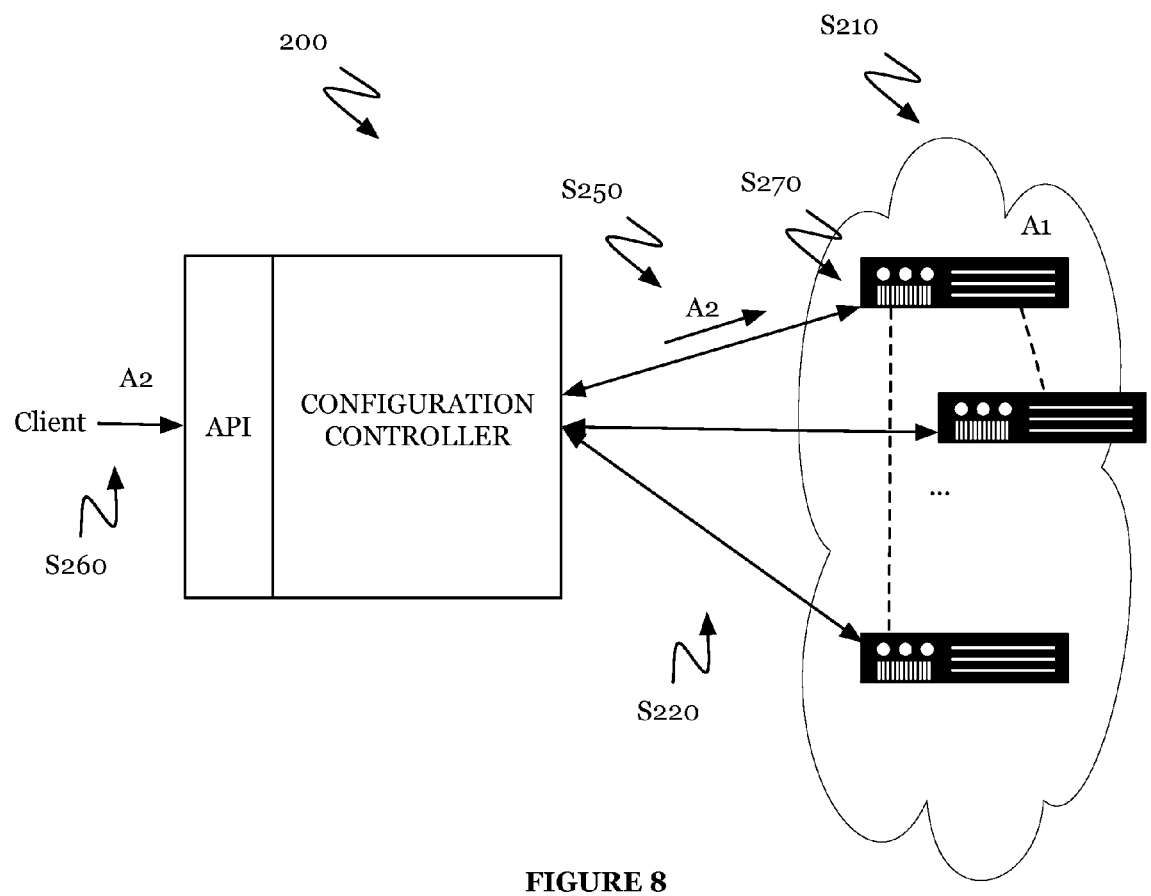
FIG. 8 is a schematic representation of a method of a second preferred embodiment.

As shown in FIG. 8, a method 200 for managing a computer cluster of a second preferred embodiment of the invention includes hosting a plurality of machines in a networked computer cluster S210, integrating a plurality of machines of the cluster with at least one configuration controller component S220, and altering the machine state of at least one service instance S250. The method functions to create an interface for easy configuration and/or orchestration of a computing cloud. The steps of the method 200 may be used in any suitable combination with the steps of method 100 above, and any of the variations of two methods may additionally be applied to either of the embodiments. Step S210, S220, and S250 is preferably substantially similar to Step S110, S120, and S150 except as noted below. Method 200 may additionally be applied to a machine or host such that multiple services of a machine may be impacted through one update.

Figure 9:
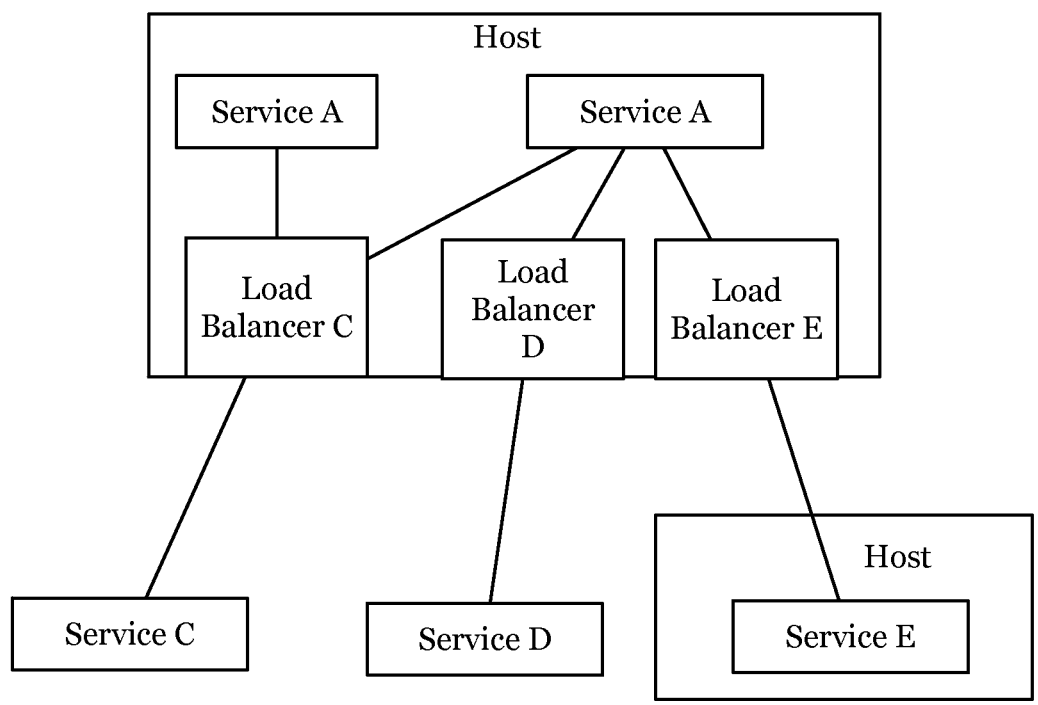
FIG. 9 is an exemplary representation of services implemented in the computing cluster.

As used in the description of method 200, a service instance preferably runs on a host. A host is preferably a machine that has one or more service instances running on the host machine. A service instance refers to a specific implementation of a service. A service preferably describes a type of module that performs a particular task or tasks within the computing cluster. For a telephony platform, the services of a computing cluster may include call routers, load balancers, call queues, media processors, message routing devices, resource databases, and/or any additional devices. In some variations, a service may be a dependent service. In other words, a first service (i.e., the dependent service) may require at least a second service. The second service may additionally be dependent on other services. The dependencies of services are preferably acyclical. A host may additionally run a load balancer for services that the hosted services depend upon as shown in FIG. 9. If multiple services of a host share a common dependency on a service, then a single load balancer may be used for that service. Each service instance preferably has machine state, but a host may additionally have machine state. As described above, machine state preferably includes configuration data and software (i.e., business logic). The machine state may additionally include operational data and/or any suitable description of the state of a service.

Figure 10:
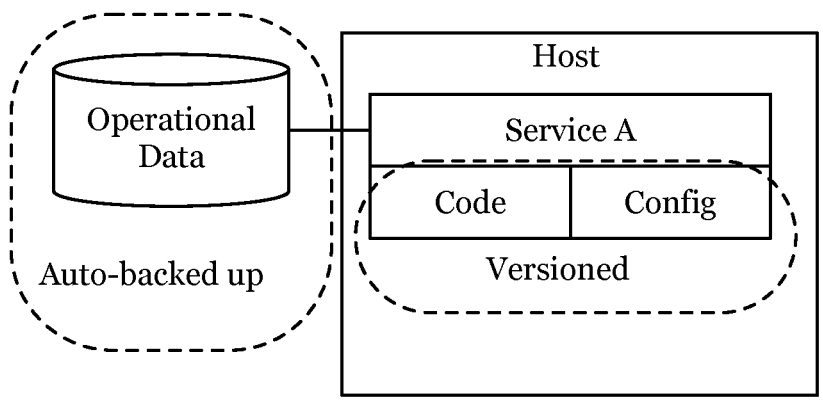
FIG. 10 is a schematic representation of machine state of a session.

Step S250, which includes updating the machine state of at least one service instance, functions to alter operation of a machine in cluster. Updating may include starting a service instance, stopping a service instance, removing a service instance, updating the version of a service instance, or reverting a version of a service, changing type of service, or any other suitable change. The update is preferably accomplished by sending a new machine state to a service instance. The machine state is preferably versioned so that the new machine state may be supplied through a version controlled version of the machine state. The software and configuration data are preferably version controlled while operational data is preferably automatically updated as shown in FIG. 10. The updating of the machine state may be initiated by an outside entity or alternatively through automatic monitoring.

One variation of the method includes receiving a specified service update S260. An API or interface may be used for users or system to supply new machine state to the configuration controller. The specified service update preferably includes at least one service to update. The update may additionally include a sub-group parameter to update a sub-group of the instances of the specified service. If sub-group parameter is note included, all instances of the specified service are preferably updated with the new machine state. The sub-group parameter may be used to update a particular instance (e.g., using an instance ID), update a fixed number, update a percentage of service instances, update a type of sub-group (e.g., service instance of a particular version number), update a services based on a combination of conditions (e.g., updating either 33% or 20 instances whichever is greater), or updated according to any suitable way of specifying a sub-group.

Figure 12:
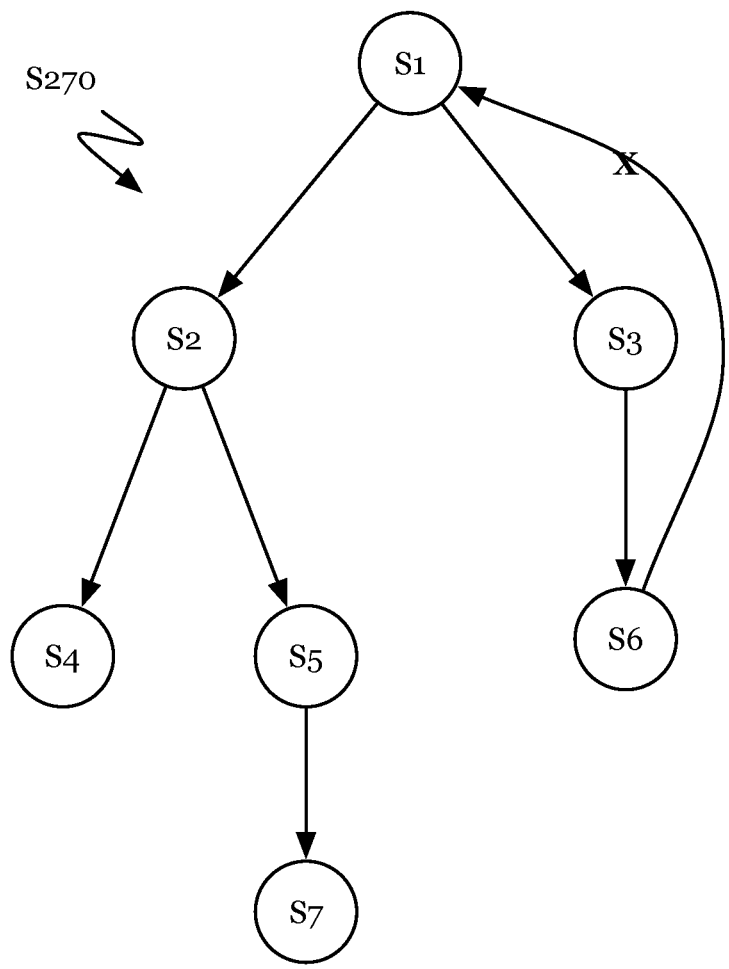
FIG. 12 is a schematic representation of a dependency graph.

The method 200 additionally preferably includes identifying service instances S270, which functions to determine which service instances to alter in Step S250. Service instances may be identified by processing a configuration file. The file is preferably describes the architecture of the plurality of machines. In one example a markup language may be used to describe the configuration as shown in FIG. 11. Sub-group parameters may be used to identify the appropriate service instances. Additionally, the Step S270 may include identifying service instances that are dependent on a particular service instance. In this way, when a service instance has machine state altered, all service instances that depend on that service instance are notified of the change. Preferably, a dependency graph is created to show the dependency relationships of the services of a computing cluster as shown in FIG. 12. The dependency graph is preferably acyclical. When building a dependency graph, the configuration of the services may additionally be validated. For example, cycles may be identified and eliminated. When altering machine state in Step S150, the service instances are preferably altered in an order based on the dependency graph. This may be from leaf nodes to dependent services or from dependent services to leaf nodes of the dependency graph. The order may additionally be based on what machine state changes are occurring. In the dependency graph, dependency order follows the connections starting at the leaf nodes. In the variation where there is a load balancer for a service, then that load balancer is preferably updated when the service being load balanced is altered.

In another variation, the method includes monitoring the operation status of machines and/or services of the computing cluster. A scaling parameter is preferably set so that services may be scaled automatically when the scaling parameter is satisfied. The scaling parameter may be threshold, a pattern of events, or any suitable parameter to trigger the altering of service and/or host machine state. Thresholds are preferably set for appropriate operation parameters, and when a machine or a service instance reaches the threshold, scaling of a service may be automatically initiated by altering the machine state of appropriate services. A threshold is preferably set for provisioning and for deprovisioning such that the computing cluster can scale up and down. The configuration controller preferably manages this monitoring, but monitoring may alternatively occur on the machine or by any suitable component. In a telecommunication platform, the computing cluster preferably has very unique scaling requirements as compared to other systems. Large spikes may occur at any time. Telecommunication platforms additionally have a plurality of types of input channels. For example, a telecommunication platform preferably supports voice sessions, messaging, (e.g., SMS and/or MMS), video, and any other suitable type of input channel. The types of input channels typically have different service requirements. Service may be monitored and automatically altered according to the type of input channel. Services that are shared between services may additionally be pooled between types of input channels. The type of input channels of a telecommunication platform may include voice, video, messaging (e.g., SMS or MMS), or any suitable type of input channel.

Additionally, the method may be used to orchestrate a computing cluster being used with sustained session. A sustained session is preferably any suitable session that requires sustained use of a service instance for the duration of the session. Some examples of sustained sessions include voice calls and video streams that occur on telecommunications platforms. A service instance handling an operation for a sustained session is preferably kept at a constant state until all sustained sessions come cease use of that service instance. Preferably, the service instances that are dependent on such a service instance are altered appropriately in preparation, and when the sustained session ends, then the service instance is altered.

3. System for Managing a Computer Cluster

Figure 13:
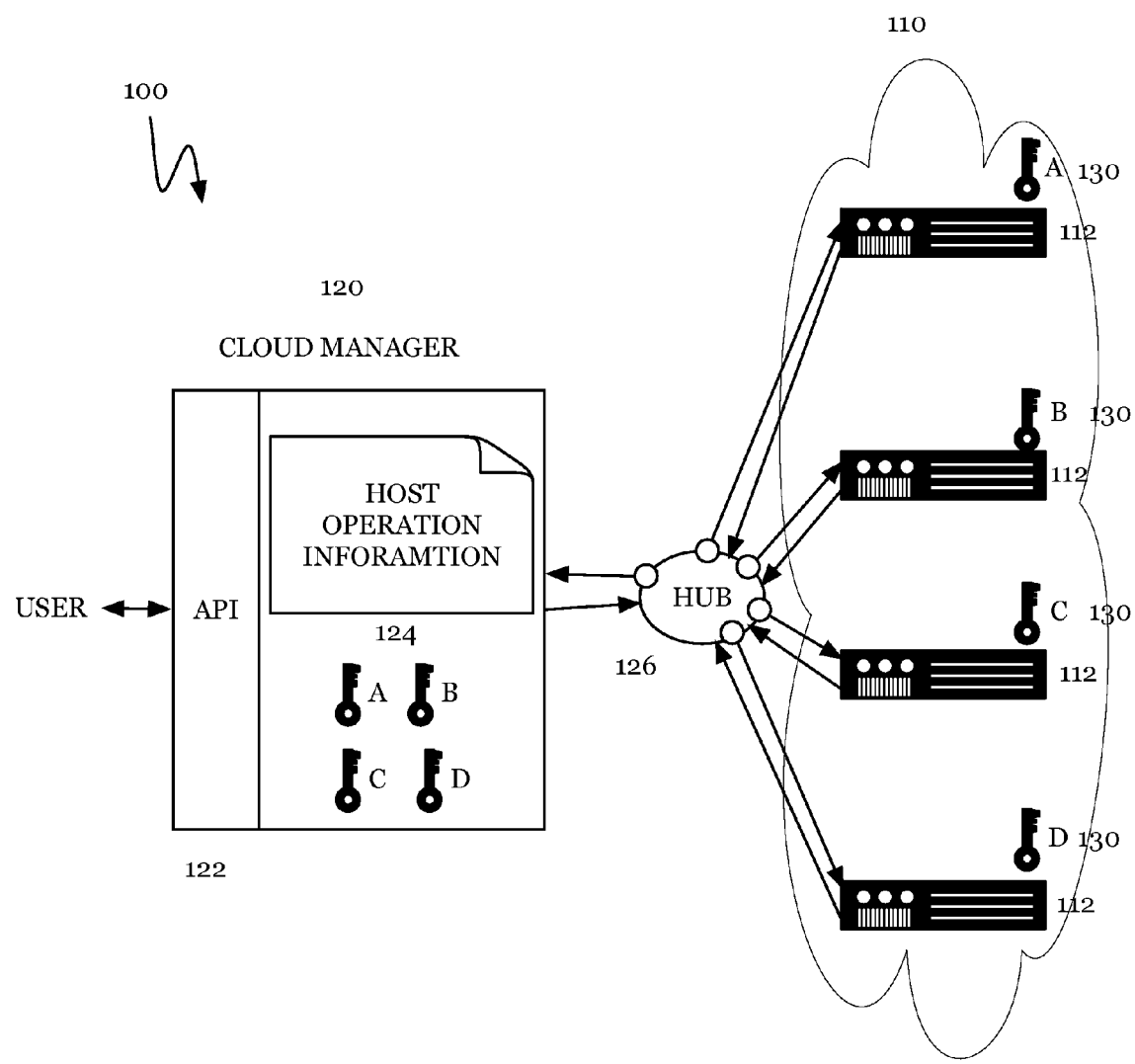
FIGS. 13 and 14 are schematic representations of a system of a preferred embodiment of the invention.
Figure 14:
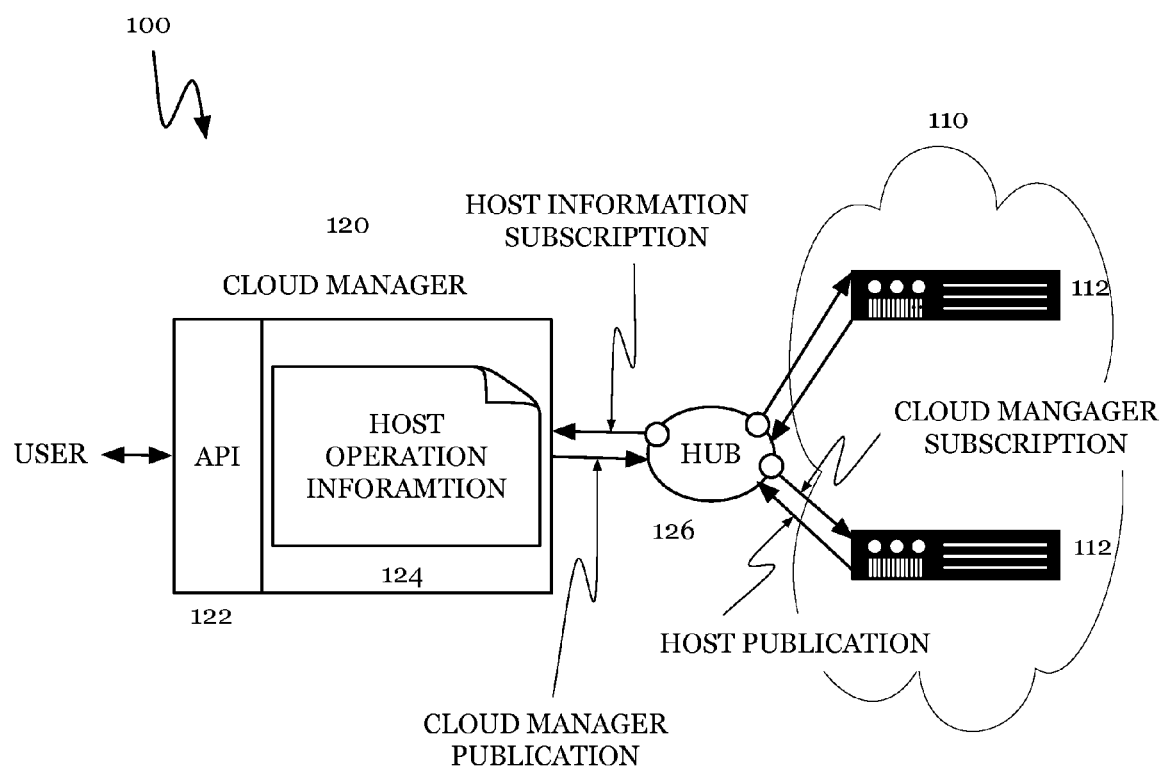

As shown in FIGS. 13 and 14, the system 100 of the preferred embodiment for managing a computer cluster preferably includes a computing cluster 110 and a configuration controller 120. The system functions to provide an interface for easy monitoring and configuration of the computing cluster 110. The configuration controller 120 preferably additionally includes an access application programming interface (API) 122, machine state database 124, and a machine communication system 126. The system 100 may be used with any suitable cloud-computing environment. One preferred embodiment uses the system 100 with a telephony network platform such as the one described in patent application Ser. No. 12/417,630 filed 2 Apr. 2009, entitled "System and Method for Processing Telephony Sessions", which is incorporated in its entirety by this reference.

The computing cluster 110 of the preferred embodiment functions to provide the base infrastructure a user is wishing to manage. The computing cluster 110 is preferably composed of a plurality of machines 112 or computing resources/machines. The machines may be identical in setup or may alternatively be composed of a variety of systems such as web servers, voice over Internet protocol (VoIP) systems, media processors, load balancers, databases, proxy servers, caches, queues, and/or any suitable computing device and/or storage devices. The computing cluster 110 may be composed of a variety of hardware systems, software platforms, and/or virtual machines. A machine 112 preferably has operation information available to interested parties, preferably access through the configuration controller 120. The operation information preferably includes machine status (e.g., booting, running, shut down, etc.), internal Internet protocol (IP) address, external IP, role (e.g., web server, VoIP, load balancer, media processor, etc.), capacity/load, and/or any suitable operation settings or information. A machine 112 preferably manages communication of the operation information and self operation (such as performing roles or changing status). A machine additionally has machine state information. The machine state information preferably includes configuration data, software, and operational data. The configuration data is preferably similar to file system related data. The software is preferably the code or source code executed by the machine. The operational data is resources such as a database, media resources, persistent data, or any suitable data used in operation. The machine state may alternatively include any suitable combination of the configuration data, software, operational data, operational information and/or other machine related data. A machine may alternatively have a parent device that manages, monitors, and communicates operation information of the machine, such as a load balancer in charge of a plurality of resources.

The configuration controller 120 of the preferred embodiment functions to act as an interface to controlling the computing cluster 110. The configuration controller functions to simplify the management and control of a cloud-computing environment. The configuration controller preferably includes an access API 122, a machine state database 124, and a machine communication system 126. The configuration controller additionally includes a state machine engine that generates new machine state of a machine. The inputs to the state machine engine preferably include the old machine state. A plurality of machine states of associated machines may additionally be input into the state machine engine.

The access API 122 preferably functions to act as an interface for interested parties to interact with operation information and change the operation of machines within the computing cluster 110. The access API is preferably a REST API (Representational State Transfer API) as is known in the art, but the access API may alternatively be a SOAP (Simple Object Access Protocol) API or any suitable programmatic communication interface. A REST API preferably follows RESTful practices as is well known in the art. RESTful is understood in this document to describe a Representational State Transfer architecture. RESTful Hypertext Transfer Protocol (HTTP) requests are preferably made to the configuration controller 120. The HTTP requests are preferably stateless, thus each message communicated preferably contains all necessary information for operation of a user command. The configuration controller preferably does not need to remember or store previous communications to be aware of the state. The machines 112, machine state, and related resources are preferably viewed as addressable resources. Consistent with the RESTful conventions, a GET request of a resource may return the current state of a resource, while PUT may update the state, PUT or POST may be used to create a new resource, and DELETE may be used to destroy a resource. The access API 112 can preferably be used by users to access operation information of one or more of the machines in the computing cluster 110. For example, as a REST API a simple HTTP request using the access API 122 can obtain a list of machines, and can preferably filter information on status, role, or any suitable operation information. The operation information is preferably returned in an HTTP response, preferably containing the operation information formatted as xml.

The machine state database 124 preferably functions to store operation information of the machines 112 of the computing cluster 110. The machine state database 124 may be any suitable database or device for storing data such as a mySQL database or an XML file. The machine state database 124 preferably stores a record for each machine 112. The information stored for each machine 112 preferably includes machine state, internal and/or external IP addresses of the machines, status, role(s), capacity/load, and/or any suitable operation information. The database 124 may additionally store a security key 130 for each machine to securely identify a machine 112.

The machine communication system 126 preferably functions to be a communication infrastructure between machines 112 of the computing cluster 110 and the configuration controller 120. The machine communication system 126 is preferably a publishing and subscription service such as pubsub messaging system. As shown in FIG. 8, the pubsub variation of the machine communication system 126 preferably has a number of configured subscriptions and publication channels. The configuration controller 120 preferably subscribes to the notifications published by the machines 112. These notifications preferably include the operation information submitted by the machines. The machines 112 preferably individually subscribe to messages from the configuration controller 120 or any suitable party such as other machines 112. New machine state is preferably communicated from the configuration controller to the machines. There is preferably a hub that the machines and the configuration controller 120 communicate through using the pubsub system. The configuration controller 120 may function as a hub or an outside system may be used as a hub. Additionally, there may be any suitable number of hubs, such as for a system geographically distributed.

Additionally, the system of the preferred embodiment preferably includes a secret key 130 shared by a machine 112 and the configuration controller 120. The secret key 130 is preferably a cryptographic code that uniquely verifies communication between the machine 112 and configuration controller 120. The secret key 130 is preferably supplied at boot time of the machine 112 but may alternatively be established at any suitable time. The secret key 130 is preferably included in communications between a machine 112 and the configuration controller 120.

4. System for Creating Distributed Groups

Figure 16:
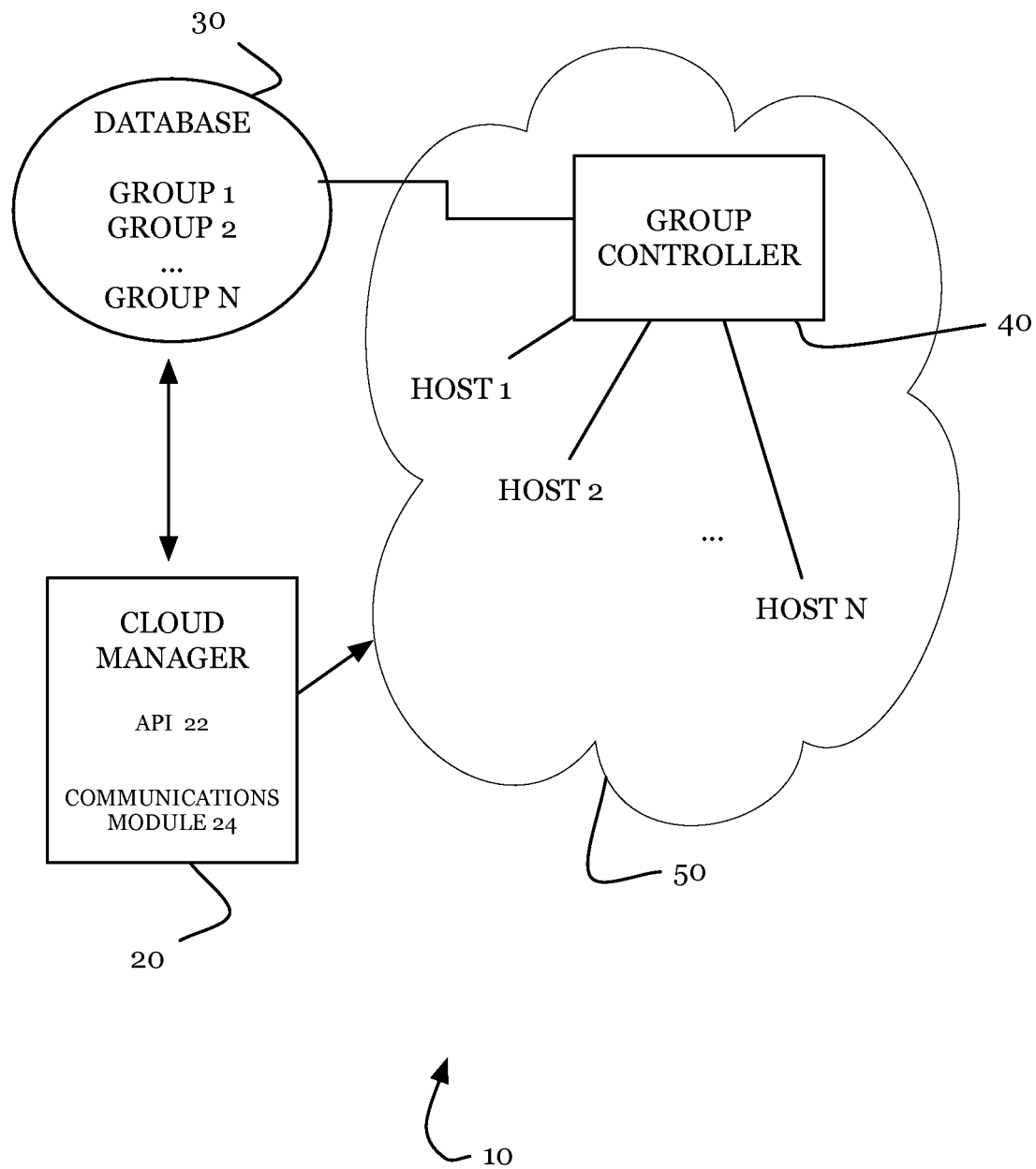
FIG. 16 is a schematic diagram of a system for creating groups in accordance with another preferred embodiment of the present invention.

As shown in FIG. 16, a system 10 for creating distributed groups in accordance with a preferred embodiment can include a cloud manager 20, a database, and a remote computer, such as for example a distributed cloud-based computing cluster 50. The system 10 preferably functions to manage the creation, distribution, maintenance, and/or life cycle of one or more groups that can be created by individual application developers, system engineers, and/or users of a cloud-based computing platform. As used herein, a group can include one or more different types of hosts, each host related internally to the other in a predetermined fashion. Suitable types of hosts can include for example: a database host, an http host, an html host, a voice transform host, an http request host, an SMS host, an IP messaging host, a text-to-speech conversion host, a recording host, a queuing host, and/or a host-controlling host (i.e., a local controller of a set of hosts or group controller). Preferably, the computing cluster 50 is distributed in a cloud-based system, which can be entirely decentralized and/or distributed from any central node or controller. One example implementation of the preferred system 10 can include multiple iterations of the computing cluster 50, each containing substantially identical groups, distributed throughout multiple regions worldwide for implementing an international cloud-based telephony platform. Accordingly, one preferred function of the system 10 is to allow for local creation, generation, and management of groups throughout multiple regions in a substantially automated and easily replicated manner.

As shown in FIG. 16, the preferred system 10 can include a cloud manager 20 that functions to permit a user (i.e., a telephony system administrator) to create and/or define a group of hosts for use in a cloud-based telephony system of the type described herein. The preferred cloud manager 20 can include a communications module 24 having a user interface through which a user can input instructions, make selections, and receive displayable information from the cloud manager 20. Suitable user interfaces can include for example web-based and/or stand-alone applications that permit user access into the cloud manager 20. A preferred user interface functions at least in part to receive commands from the user and transmit those commands to the cloud manager 20 for execution as set forth herein. The preferred system 10 can also include an access API 22, which preferably functions to act as a machine interface between the cloud manager 20 and the computing cluster 50 to create and/or change the operation of machines, hosts and/or groups within the computing cluster 50. As noted elsewhere herein, the access API 22 is preferably a REST API as is known in the art, but the access API may alternatively be a SOAP API or any suitable programmatic communication interface. A REST API preferably follows RESTful practices as is well known in the art. The access API 22 can preferably be used by users to access and/or change operation information of one or more of the groups in the computing cluster 50. For example, as a REST API a simple HTTP request using the access API 22 can obtain a list of groups, and can preferably filter information on status, role, or any suitable operation information. The operation information is preferably returned in an HTTP response, preferably containing the operation information formatted as an xml file.

As shown in FIG. 16, the system 10 preferably includes a cloud manager 20, which functions to simplify and automate the creation of a group of hosts on and/or at the computing cluster 50. The cloud manager 20 preferably includes an access API 22 and a communications module 24 described above. The preferred cloud manager 302 can additionally include a state machine engine that generates new machine state of a machine. The inputs to the state machine engine preferably include the old machine state. A plurality of machine states of associated machines may additionally be input into the state machine engine. The preferred cloud manager 20 can further include a server that interfaces with a file repository (not shown) to retrieve, fetch, and/or pull definition files from the repository. The server component of the preferred cloud manager 20 can also compile newly retrieved, fetched, and/or pulled definition files into group types, which can be locally stored at a database 30. As described below in greater detail, the cloud manager 20 can also start, initiate, launch, generate, and/or create one or more groups at the computing cluster 50.

As shown in FIG. 16, the preferred system 10 can further include a database 30, which functions to store operation information of the groups of the computing cluster 50. The database 30 may be any suitable database or device for storing data such as a mySQL database or an XML file.

Alternatively, the database 30 can be a distributed database such as ZooKeeper or a quorum-based database. The database 30 preferably stores a record for each group. The information stored for each group preferably includes at least group definitions and group configurations, group status, group role(s), capacity/load, and/or any suitable operation information relating to the group or any portion thereof. Collectively, the group definitions and group configurations can define a group policy or rule set that delineates the particular functional state/s of the group and/or the host-members of the group. In another variation of the preferred system 10, the database 30 can additionally store a security key, token, or hash to securely identify each group on the computing cluster 50.

In one example implementation, the preferred system 10 permits a user to select one or more groups and/or types of groups that he or she desires to be implemented on the computing cluster 50. For example, a user can select a particular type of group (i.e., a voice group) that can include one or more types of hosts that are necessary or desirable for performing voice telephony functions through a cloud-based platform. Suitable voice group hosts can include for example a database host, an http host, an html host, a voice transform host, an http request host, a queuing host, and/or a host-controlling host (i.e., a local controller of a set of hosts or group controller). Preferably, upon receipt of the desired configuration, the cloud manager 20 consults the database 30 to determine the exact configuration and/or rules applicable to the selected group and then interfaces with the computing cluster 50 and instructs the computing cluster 50 to initiate the group as requested. Preferably, the cloud manager 20 can interact directly with the cloud provider to provide the proper size, boot sequence, interconnectivity, and/or functionality of each host within the selected group. Preferably, when starting a new group, the preferred system 10 provides for an automated process for bringing up clean servers at the computing cluster 50 and installing software and/or other configurations that substantially match the desired state set forth in by the group definitions in the database 30. The preferred cloud manager 20 can also be configured to monitor and/or terminate any or all groups that it creates as described herein.

Preferably, each group includes a local group controller 40 as shown in FIG. 16. In this example configuration of the preferred system, once the selected group is configured and operational, then the group controller 40 can take over local control of the group at the computing cluster 50 without need or requirement of further instruction from the cloud manager 20. Preferably, the group controller 40 be configured as a host itself internal to the computing cluster 50 and further configured to communicate with, monitor, and/or control each other host within its predefined group. In variations of the example configuration of the preferred system 10, the group controller 40 can be further configured to maintain its predefined group in its defined state. For example, if host A in the group fails or crashes, the group controller 40 can automatically respond by reinstating a new host A' that complies with the functional and performance requirements for that type of host as set forth by the database 30. In another variation of the example configuration of the preferred system, the group controller 40 can be configured to automatically notify the cloud manager 20 and/or the database 40 in response to any failure, crash, and/or operational difficulty with any of the hosts within its group. The alarm function of the group controller 40 preferably enables the preferred system 10 to run automated diagnostics or debugging exercises in response to repeated and/or systematic failures within certain types of group deployments. As an example, any of the following conditions can constitute a failure of the type that can elicit remediation by the group controller 40: a host program error, a host program crash, a cloud hardware failure, a cloud software/firmware failure, a communication network failure, and/or a dependency failure (i.e., if a basic host fails, all hosts that depend from the basic host will also be subject to failure).

In another variation of the preferred system 10, the group controller 40 can be responsive to external parameters in determining its group configuration and/or operations. For example, the user can establish one or more threshold conditions as part of setting up the group at the cloud manager 20 and/or incorporate such threshold conditions into the group definitions themselves at the database 30. Example threshold conditions can include changing business conditions and/or changing resource allocations, either of which can be handled either proactively or reactively by the preferred system 10. In another example implementation of the preferred system 10, the user can establish that if a certain call volume is achieved and/or expected, the group controller 40 is to create or generate more host resources to meet the increased demand. Thus a call center might reasonably expect an increased voice call demand during the holiday season when people are anticipated to spend more time speaking with loved ones over a voice connection. Accordingly, the preferred system 10 can be configured to automatically create more voice group resources either in response to the increased demand (i.e., through a feedback loop), or in anticipate of the increased demand (i.e., though user expectations, statistical modeling, and the like). Group expansion/contraction in response to a threshold conditions is preferably controlled through one or both of the API 22 or the group controller 40. Alternatively, one or both of the API and the group controller 40 can coordinate with the database 30 to register and/or approve of the changes in the group configurations (i.e., expanded or contracted group definitions). In another alternative, the definition of a threshold-condition-sensitive group can include an underlying variable resource definition that allows for the group controller to expand/contract the size and/or scope of the group in response to existing or predicted conditions.

5. Method for Creating Distributed Groups

Figure 17:
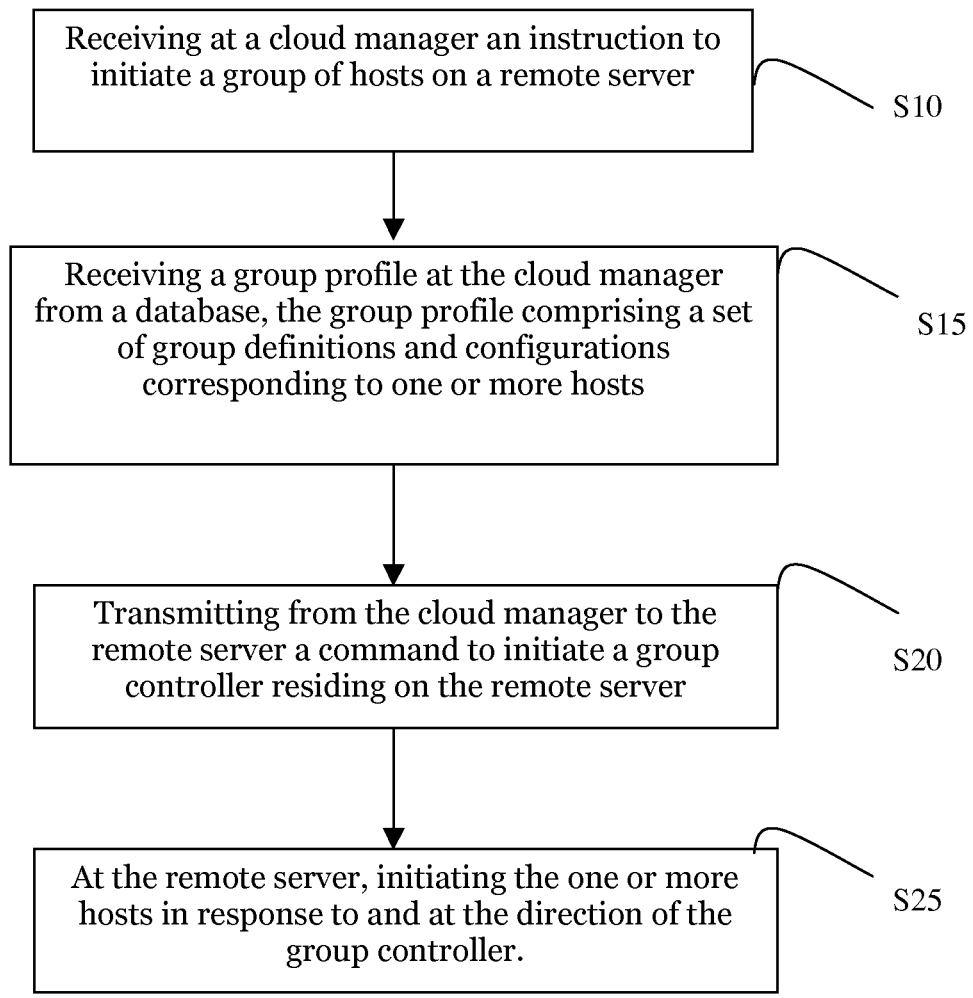
FIG. 17 is a block diagram depicting a method for creating groups in accordance with another preferred embodiment of the present invention.

As shown in FIG. 17, a method for creating distributed groups in accordance with a preferred embodiment can include: receiving at a cloud manager an instruction to initiate a group of hosts on a remote server in block S10; receiving a selection of a group profile at the cloud manager from a database, the group profile including a set of group definitions and configurations corresponding to one or more hosts in block S15; transmitting from the cloud manager to the remote server a command to initiate a group controller residing on the remote server in block S20, and at the remote server, initiating the one or more hosts in response to and at the direction of the group controller in block S25. The method preferably functions to manage the creation, distribution, maintenance, and/or life cycle of one or more groups that can be created by individual application developers, system engineers, and/or users of a cloud-based computing platform. As noted above, a group can include one or more different types of hosts, including for example: a database host, an http host, an html host, a voice transform host, an http request host, an SMS host, an IP messaging host, a text-to-speech conversion host, a recording host, a queuing host, and/or a host-controlling host (i.e., a local controller of a set of hosts or group controller). Preferably, the method can be performed by one or more of a cloud manager, a database, and/or a remote server. Preferably, the remote server can include a distributed cloud-based computing cluster such as that described above. In one example implementation of the preferred method, the method can function to populate multiple computing clusters with substantially identical groups and distributed throughout multiple regions worldwide for implementing an international cloud-based telephony platform. Accordingly, one preferred function the method is to allow for local creation, generation, and management of groups throughout multiple regions in a substantially automated and easily replicated manner.

As shown in FIG. 17, the preferred method can include block S10, which recites receiving at a cloud manager an instruction to initiate a group of hosts on a remote server. Block S10 preferably functions to retrieve, capture, input, initiate, and/or receive a set of instructions from a user relating to the implementation, creation, and/or generation of one or more hosts operable on a remote server. Preferably, block S10 is performed at or by a cloud manager of the type described above, which is configured for causing, instructing, and/or commanding the creation of the group at the remote server. Preferably, a user interface is integrated into the cloud manager to permit the user to have simple access the computing cluster. In one variation of the preferred method, the instruction received in block S10 can include a selection of a group from a predetermined set of groups having predefined functions or capabilities. As an example, a user might be able to select a voice group, a messaging group, a video group, an infrastructure group, or any combination thereof, where each type of group can include one or more distinct hosts or combinations of hosts for performing set types of functions within the overall telephony system. In one variation of the preferred method, block S10 can be performed by an access API of the type described above. As noted elsewhere herein, the access API is preferably a REST API as is known in the art, but the access API may alternatively be a SOAP API or any suitable programmatic communication interface. A REST API preferably follows RESTful practices as is well known in the art. A suitable access API can preferably be used by users to access and/or change operation information of one or more of the groups in the computing cluster. For example, as a REST API a simple HTTP request using the access API can obtain a list of groups, and can preferably filter information on status, role, or any suitable operation information. The operation information is preferably returned in an HTTP response, preferably containing the operation information formatted as an xml file.

As shown in FIG. 17, the preferred method can further include block S15, which recites receiving a group profile at the cloud manager from a database. Preferably, in block S15 the group profile includes a set of group definitions and configurations corresponding to one or more hosts. Block S15 preferably functions to provide the cloud manager with the specifications and definitions of the selected group as stored and/or recorded at the database. As noted above, a suitable database preferably functions to store operation information of the groups of the computing cluster. The database can be any suitable database or device for storing data such as a mySQL database or an XML file. Alternatively, the database can be a distributed database such as ZooKeeper or a quorum-based database. The database preferably stores a record for each group. The information stored for each group preferably includes at least group definitions and group configurations, group status, group role(s), capacity/load, and/or any suitable operation information relating to the group or any portion thereof. As noted above, collective group definitions and group configurations can define a group policy or rule set that delineates the particular functional state/s of the group and/or the host-members of the group. In another variation of the preferred method, the database can additionally store a security key, token, or hash to securely identify each group on the computing cluster.

As shown in FIG. 17, the preferred method can additionally include block S20, which recites transmitting from the cloud manager to the remote server a command to initiate a group controller residing on the remote server. Block S20 preferably functions to begin formation of a group having one or more hosts at the remote server through delegation of the process to the group controller. As shown in FIG. 17, the preferred method can additionally include block S25, which recites initiating the one or more hosts in response to and at the direction of the group controller. Preferably, the group controller is enabled to initiate and/or create the remaining host/s in its group in response to the group profile. Alternatively, the cloud manager can initiate the group controller and an additional one or more hosts substantially simultaneously in block S20. For example, block S20 can including initiating the group controller, a database host, and an http host by the cloud manager; while block S25 can include initiating an additional database host, an html host, and a voice transform host by the group controller in response to the group profile. Those of skill in the art will readily appreciate that actuation of the group hosts can be initially accomplished by any suitable combination of the cloud manager and the group controller at the discretion of the user and/or optimization of the available computing resources.

Figure 18:
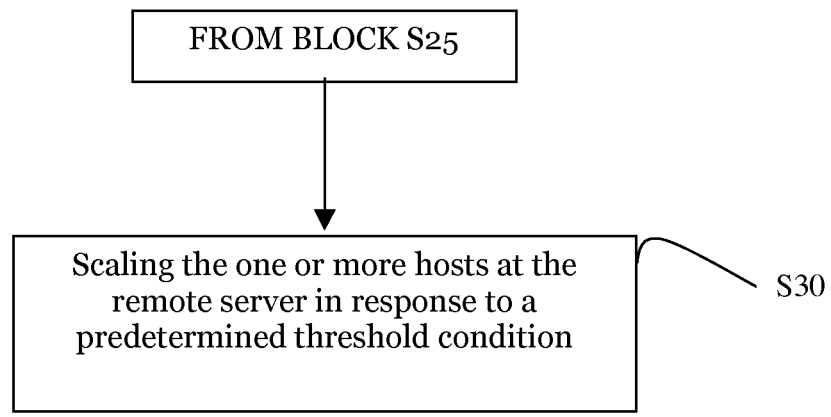
FIG. 18 is a block diagram depicting a method for creating groups in accordance with a variation of the preferred embodiment of the present invention.

As shown in FIG. 18, one variation of the preferred method can include block S30, which recites scaling the one or more hosts at the remote server in response to a predetermined threshold condition. Block S30 preferably functions to automatically and reliably generate, create, and/or initiate one or more types of hosts at the remote server in response to attainment or exceeding a predetermined threshold condition. Alternatively, block S30 can also preferably function to automatically and reliable eliminate, delete, and/or terminate one or more types of hosts at the remote server in response to attainment of exceeding the predetermined threshold condition. Preferably, scaling can include increasing or decreasing the number and/or type of hosts at the remote server. The group controller preferably performs Block S30, although additional external control can be provided by or at the cloud manager by changing one or more aspects or measurements of the predetermined threshold condition. In another variation of the preferred method, the predetermined threshold can include a business metric, such as for example an expected/desired call quality, an expected/desired latency value, an expected/desired user experience, and the like. As an example, a business user can establish a business metric that all voice transmissions are to be at or above a certain level of quality, and should the actual or predicted voice quality drop beneath that threshold, the group controller preferably automatically initiates additional hosts in order to accommodate the actual or predicted traffic and maintain the appropriate voice quality. In another variation of the preferred method, the predetermined threshold can include a usage metric, such as for example a certain number of voice transmissions, SMS transmissions, network traffic, and the like. Thus, the user can establish a usage metric that indicates in response to a certain traffic volume the group controller preferably automatically increases/decreases the number of hosts and/or the types of hosts in the group in order to accommodate the increase/decrease in network traffic. Alternatively, the predetermined threshold condition can include any user-defined threshold or metric that requires scaling of the group resources in an automated and reliable manner. Each of the foregoing aspects of the preferred method permit the user to set one or more parameters and then delegate the authority to make any desired changes to the group controller, such that the group controller can maintain the optimal operating state of the group on-the-fly and without any needed intervention or instruction from the user.

In another variation of the preferred method, block S25 can further include initiating the one or more hosts in a predetermined order. Preferably, the predetermine order includes initiating independent hosts substantially prior to dependent hosts. As an example, some types of hosts might be dependent upon other types of hosts, i.e., an http host might depend upon a database host for its functionality. Consequently, in this variation of the preferred method, block S15 can include initiating the database host substantially prior to initiating the http host. Preferably, the database host will be fully configured prior to beginning the initiation of the http host. Alternatively, the database host initiation can be started, but not necessarily finished in its entirety, prior to beginning the initiation of the http host. In another variation of the preferred method, block S25 can include initiating multiple dependent hosts from multiple independent hosts at substantially the same time, i.e., generating multiple http and/or html hosts from multiply initiated database hosts within the same group. In still another variation of the preferred method, the predetermined order in which the hosts are initiated can be established according to user request, resource availability, system demands (i.e., servicing immediate needs over future needs), locality or region in which the groups/computing cluster are located, and/or any other suitable or desirable condition or ordering.

Figure 19:
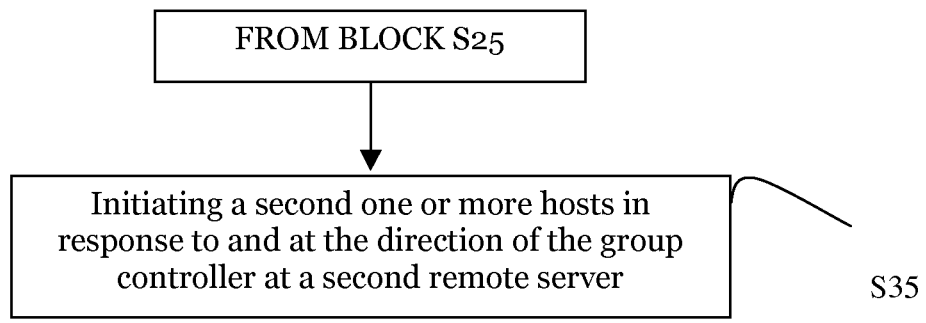
FIG. 19 is a block diagram depicting a method for creating groups in accordance with a variation of the preferred embodiment of the present invention.

As shown in FIG. 19, in another variation the preferred method can further include block S35, which recites initiating a second one or more hosts in response to and at the direction of the group controller at a second remote server. Block S35 preferably functions to generate an additional group configuration at the first remote server in a second remote server. In one alternative variation of the preferred method, the second one or more hosts are substantially identical to the first one or more hosts, i.e., the second group is a replica or mirror of the first group. For example, block S35 can optionally function to create a distributed backup of the first group as a failsafe. Additionally, block S35 can optionally function to create an operational replica of the first group in the event that the first group experiences a substantial failure, such as a cloud failure, a hardware failure, a system-wide power failure, or the like. In another alternative variation of the preferred method, block S35 can include creating the second set of one or more hosts in a different country or region than the first host. For example, a user with substantial international traffic can create a first group operational in the United States and have matching or substantially identical groups automatically created in Europe and Asia to ensure a robust and efficient international telephony system distributed over multiple computing clusters.

Figure 20:
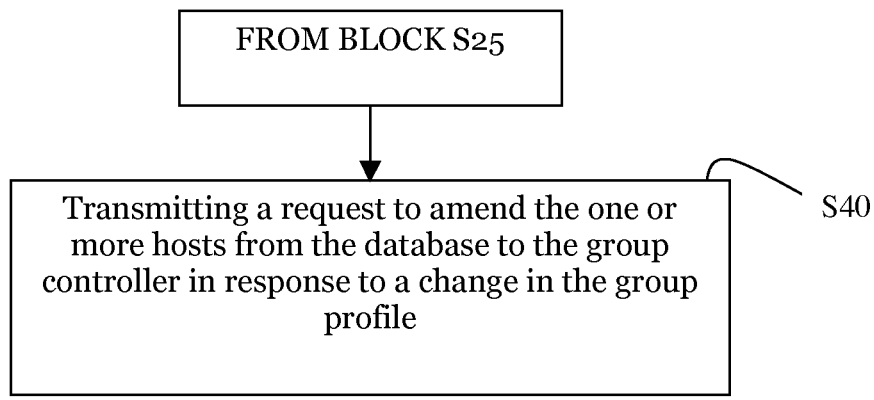
FIG. 20 is a block diagram depicting a method for creating groups in accordance with a variation of the preferred embodiment of the present invention.
Figure 21:
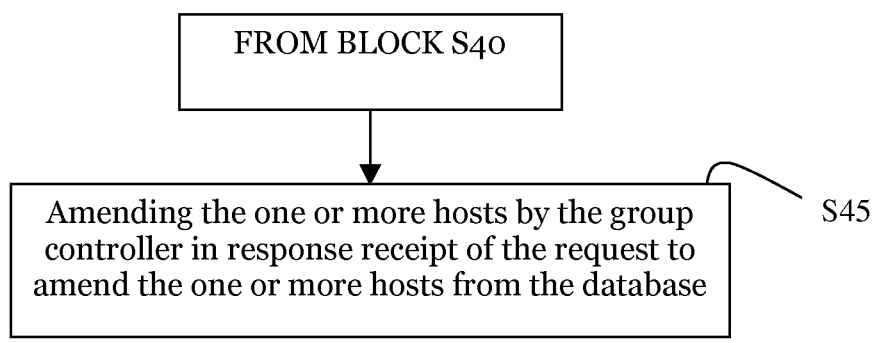
FIG. 21 is a block diagram depicting a method for creating groups in accordance with a variation of the preferred embodiment of the present invention.

As shown in FIG. 20, another variation of the preferred method can include block S40, which recites transmitting a request to amend the one or more hosts from the database to the group controller in response to a change in the group profile. Block S40 preferably functions to automatically and reliably cause modification, amendment, and/or adjustment in the group composition in response to a change in the group profile. Block S40 is preferably performed automatically from the database in response to a change in the group profile, i.e., the addition or deletion of certain hosts, the functions of one or more hosts, or the definitions of the group itself. Alternatively, block S40 can be performed by one or both of the database or the cloud manager. As shown in FIG. 21 in response to the request made in block S40, a variation of the preferred method can include amending the one or more hosts by the group controller in response receipt of the request to amend the one or more hosts from the database in block S45. Block S45 preferably functions to automatically and reliable modify, amend, and/or adjust the group composition in response to the request from the database. Alternatively, the request to which block S45 responds can be from either one or both of the database or the cloud manager. Exemplary amendments and modifications to the group configuration can include for example: addition or deletion of a host; change in the function of a host; change in the rules governing the group composition; change in the rules governing the group operation; and/or a change in the definition of the group that require any of the foregoing modifications or amendments.

Figure 22:
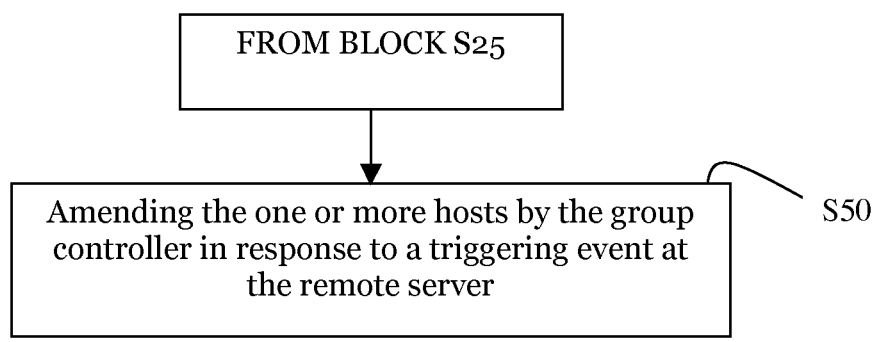
FIG. 22 is a block diagram depicting a method for creating groups in accordance with a variation of the preferred embodiment of the present invention.

As shown in FIG. 22, another variation of the preferred method can include block S50, which recites amending the one or more hosts by the group controller in response to a triggering event at the remote server. Block S50 preferably functions to automatically and reliably modify, alter, and/or amend the one or more hosts composing the group in response to a triggering event at the remote server. Preferably, block S50 is performed automatically by the group controller in accordance with a set of instructions, rules, and/or definitions relating to the proper configuration and/or operation of its group. As an example, the group definitions might require that a certain number of http hosts be operating at any given time, such that in the event of failure of one the http hosts, the group controller preferably automatically responds and generates a replacement http host and directs traffic to the new host in lieu of the failed host. Preferably, any changes to the one or more hosts can include reinitiating the one or more hosts to state substantially identical to a preexisting state at the triggering event so that the user experience is entirely seamless and there is substantially zero loss in the information or state of the system. In another variation of the preferred method, block S50 can include adjusting the flow of data to and/or the load placed on any of the one or more hosts in order to improve traffic routing and/or processing of the various requests being directed at the respective hosts. Additional features and aspects of a preferred system and method of managing distributed groups of hosts is described in detail below with reference to FIGS. 23 to 27.

6. System for Managing Distributed Groups

Figure 23:
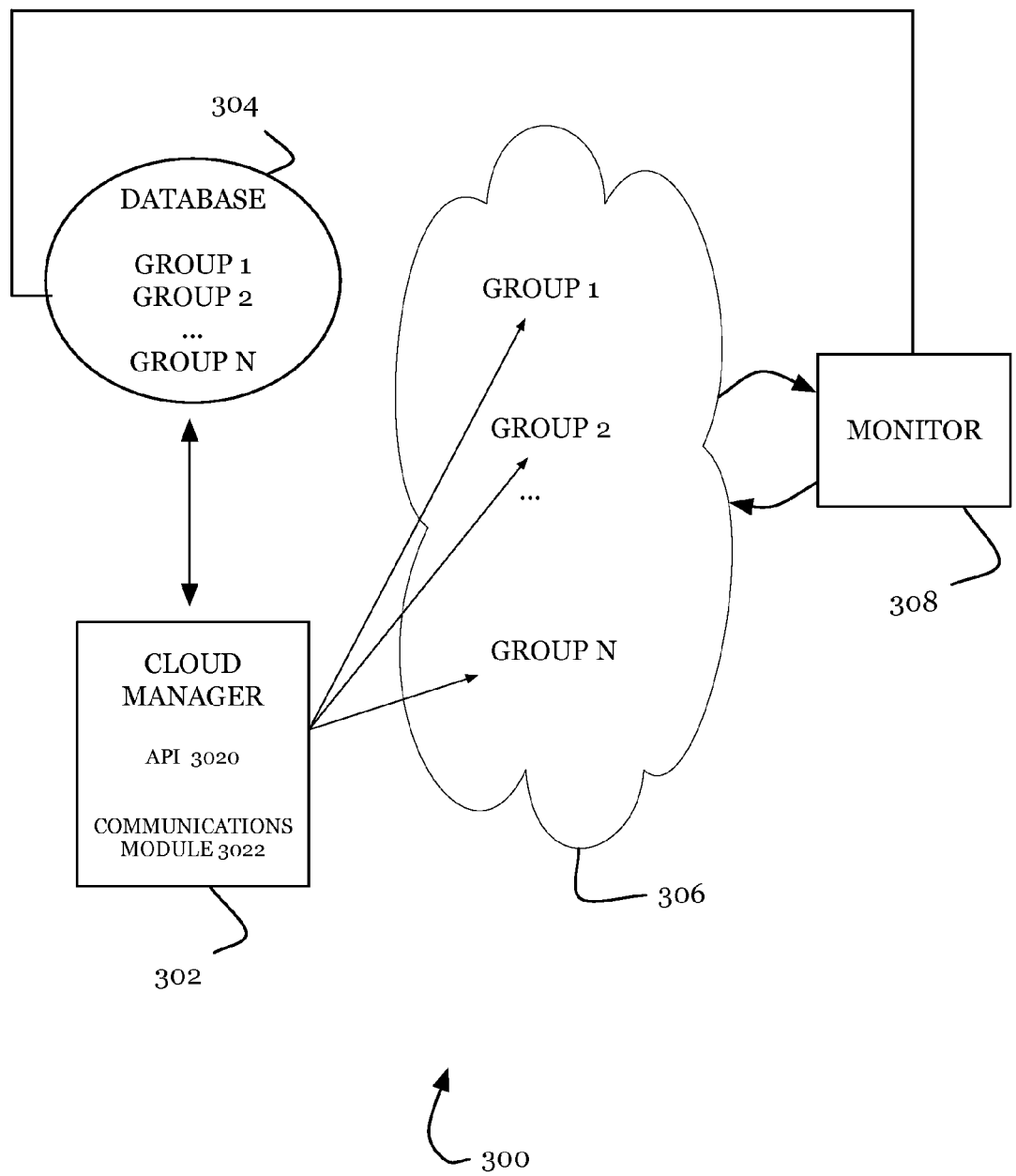
FIG. 23 is a schematic diagram of a system for managing groups in accordance with another preferred embodiment of the present invention.

As shown in FIG. 23, a system 300 for managing distributed groups in accordance with a preferred embodiment can include a cloud manager 302, a database 304, a computing cluster 306, and a monitor 308. The system 300 preferably functions to manage the creation, distribution, maintenance, and/or life cycle of one or more groups that can be created by individual application developers, system engineers, and/or users of a cloud-based computing platform. As used herein, a group can include one or more different types of hosts, each host related internally to the other in a predetermined fashion. The preferred system 300 can further function to ensure that each host (and/or each machine at the computing cluster) is booted, maintained, updated, and managed in an appropriate and desirable order. The preferred system 300 can further include a configurations repository (not shown) configured for receiving and storing commits relating to the structure and/or function of one or more groups. The cloud manager 302 preferably additionally includes an access API 3020 and a machine communication system 3022 of the type described above. The preferred system 300 can be used with any suitable cloud-computing environment. One preferred embodiment uses the system 300 with a telephony network platform such as the one described in patent application Ser. No. 12/417,630 filed 2 Apr. 2009, entitled "System and Method for Processing Telephony Sessions," incorporated by reference above.

As shown in FIG. 23, the preferred system 300 can include an access API 3020, which preferably functions to act as an interface for interested parties to interact with operation information and create and/or change the operation of machines and/or groups within the computing cluster 306. As noted above, the access API 3020 is preferably a REST API as is known in the art, but the access API may alternatively be a SOAPAPI or any suitable programmatic communication interface. Any HTTP requests are preferably stateless, thus each message communicated preferably contains all necessary information for operation of a user command. The cloud manager 302 preferably does not need to remember or store previous communications to be aware of the state. The groups and all related resources are preferably viewed as addressable resources. Consistent with the RESTful conventions, a GET request of a resource returns the current state of a resource, while PUT updates the state, both PUT or POST creates a new resource, and DELETE destroys or terminates a resource. The access API 3020 can preferably be used by users to access and/or change operation information of one or more of the groups in the computing cluster 306. For example, as a REST API a simple HTTP request using the access API 3020 can obtain a list of groups, and can preferably filter information on status, role, or any suitable operation information. The operation information is preferably returned in an HTTP response, preferably containing the operation information formatted as an xml file.

As shown in FIG. 23, the preferred system can further include a communications module 3022, which preferably functions to be a communication infrastructure between the computing cluster 306, the database 304, and the cloud manager 302. The machine communication system 126 is preferably a publishing and subscription service such as pubsub messaging system of the type described above with reference to FIG. 8. The preferred system 200 can additionally include a hub (not shown) through which the cloud manager 302 and the computing cluster 306 communicate using the pubsub system. The cloud manager 302 or any other suitable external system can function as a hub in the preferred system 300. Preferably, one or more hubs can be used in a geographically distributed system 300.

As shown in FIG. 23, the system 300 preferably includes a cloud manager 302, which functions to simplify the management and control of a cloud-computing environment. The cloud manager preferably includes an access API 3020 and a machine communication system 3022. The preferred cloud manager 302 can additionally include a state machine engine that generates new machine state of a machine. The inputs to the state machine engine preferably include the old machine state. A plurality of machine states of associated machines may additionally be input into the state machine engine. The preferred cloud manager 302 can further include a server that interfaces with a file repository (not shown) to retrieve, fetch, and/or pull definition files from the repository. The server component of the preferred cloud manager 302 can also compile newly retrieved, fetched, and/or pulled definition files into group types, which can be locally stored at the database 304. As described below in greater detail, the cloud manager 302 can also launch one or more groups at the computing cluster 306 as well as the monitor module 308.

As shown in FIG. 23, the preferred system 300 can further include a database 304, which functions to store operation information of the groups of the computing cluster 306. The database 304 may be any suitable database or device for storing data such as a mySQL database or an XML file. Alternatively, the database 304 can be a distributed database such as ZooKeeper or a quorum-based database. The database 304 preferably stores a record for each group. The information stored for each group preferably includes at least group definitions and group configurations, group status, group role(s), capacity/load, and/or any suitable operation information relating to the group or any portion thereof. The database 304 can additionally store a security key, token, or hash to securely identify each group on the computing cluster 306.

The computing cluster 306 of the preferred system can include one or more of a plurality of machines, groups of machines, states of machines, and/or any combination thereof. As noted above, suitable machines can be identical in setup or may alternatively be composed of a variety of systems such as web servers, voice over Internet protocol (VoIP) systems, media processors, load balancers, databases, proxy servers, caches, queues, and/or any suitable computing device and/or storage devices. The preferred computing cluster 306 can additionally include a variety of hardware systems, software platforms, and/or virtual machines. As noted above, each machine in a group preferably has operation information available to interested parties, preferably access through the cloud manager 302. The operation information preferably includes machine status (e.g., booting, running, shut down, etc.), internal Internet protocol (IP) address, external IP, role (e.g., web server, VoIP, load balancer, media processor, etc.), capacity/load, and/or any suitable operation settings or information. A group preferably includes at least a group definition and a group configuration. Preferably, the group definition includes a domain specific language (DSL) that permit the group/s to be compiled into group types by the cloud manager 302. Suitable group configuration attributes can include a condition class and/or an action class. Preferably, each of the group definition and group configuration are maintained statelessly, thereby permitting RESTful configuration, monitoring, and updating throughout the system 300 according to the principles set forth above.

As shown in FIG. 23, the preferred system 300 can further include a monitor module 304, which preferably functions to continuously monitor the status of each group in the computing cluster 306 and to ensure that such current status is consistent with and/or substantially identical to a desired status of the user. As shown in FIG. 16, a monitor module 304 can monitor a plurality of groups A . . . N. Alternatively, each group A . . . N can be monitored by a dedicated monitor module 304 that is the exclusive monitor of the group state at the database 304 and the computing cluster 306. Preferably, the monitor module 304 includes a set of rules defining a rules engine that can be applied in a substantially continuous manner to each of the database 304 and the computing cluster 306. In operation, the group status is updated via the API 3020 to the database 304 and, in most cases, the matching group at the computing cluster 306 is placed into the desired state. The monitor module 308 preferably checks the actual status of the group in the computing cluster 306 and, using the rules engine, compares the actual state of the group to the desired group state stored in the database 304. Preferably, the rules engine includes a series of when/then rules or scripts, such that the monitor module 308 only takes action (then) in response to a predetermined set of conditions (when). As an example, if the database 304 indicates that a group is to be started, but the computing cluster 306 indicates that no hosts have been booted, then the monitor module 308 directs the computing cluster 306 to boot the desired hosts. Similarly, if one or more hosts are running but are not present in the load balancer, then the monitor module 308 directs the computing cluster 306 to transfer the hosts into the load balancer. Preferably, the monitor module 308 operates the rules engine in a substantially or entirely stateless manner such that the prior status of the system 300 is not stored, maintained, or otherwise determinative of the present behavior of the monitor module 308.

7. Method for Managing Distributed Groups

Figure 24:
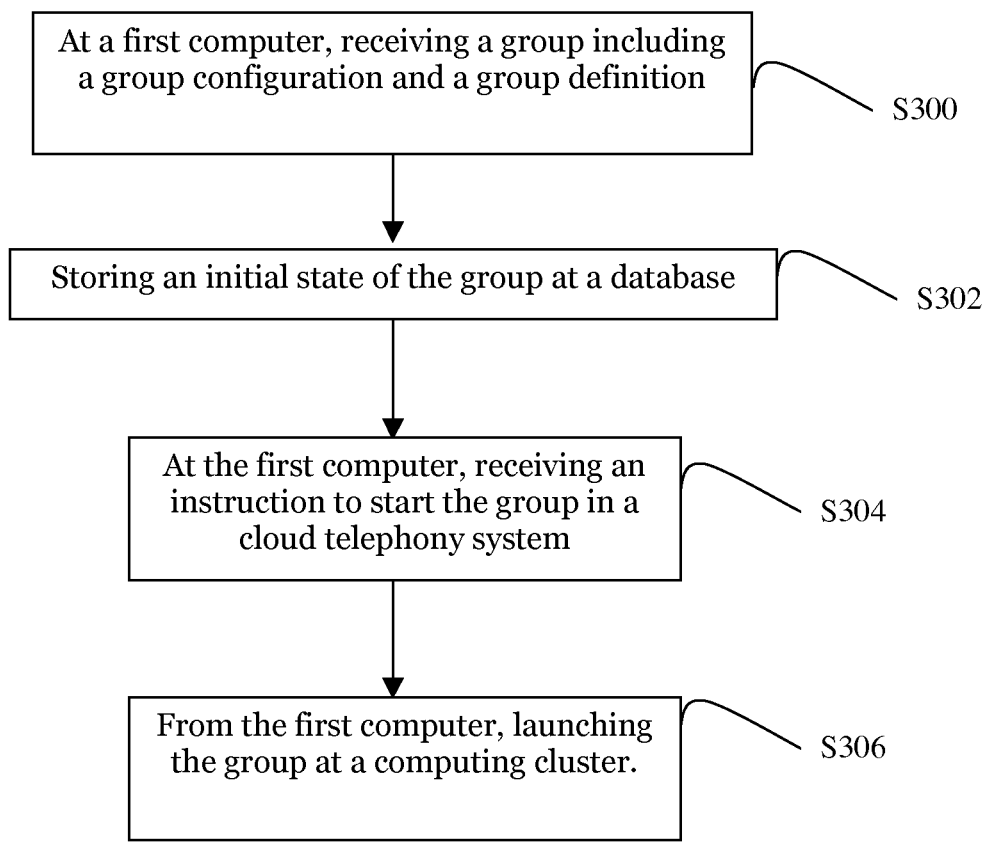
FIG. 24 is a block diagram depicting a method for managing groups in accordance with another preferred embodiment of the present invention.

As shown in FIG. 24, a method for managing distributed groups in accordance with a preferred embodiment can include at a first computer, receiving a group including a group configuration and a group definition in block S300; storing an initial state of the group at a database in block S302; at the first computer, receiving an instruction to start the group in a cloud telephony system in block S304; and from the first computer, launching the group at a computing cluster in block S306. The method preferably functions to readily enable a user to establish, create, adjust, update, and/or monitor one or more machine groups usable in a distributed computing system. The preferred method can be used in any suitable cloud-computing environment. The preferred method is also usable in a telephony network platform such as the one described in patent application Ser. No. 12/417,630 filed 2 Apr. 2009, entitled "System and Method for Processing Telephony Sessions," incorporated by reference above.

As shown in FIG. 24, the preferred method includes block S300, which recites receiving a group including a group configuration and a group definition at a first computer. Block S300 preferably functions to receive, pull, request, retrieve, and/or fetch one or more aspects relating to a group to a first computer. Preferably, the first computer is a cloud manager having an access API and communications module of the type described above. Preferably, group configurations and/or group definitions can be stored on a file repository by any user, from which they can be received at the first computer. As noted above, block S300 can include both passive receipt (i.e., having files pushed to the first computer), active retrieval (i.e., requesting or fetching the requisite files), or any suitable combination thereof. In one variation of the preferred method, block S300 can further include compiling the group definitions into group types based on one or more of the group configurations. Preferably, a group configuration can include a set of rules having one or both of a condition class and an action class. As used herein, a condition class can refer to a state or mode in which the group can be; and an action class can refer to an action or operation that the group can perform or that can be performed on the group to create a desired condition. Preferably, each group has its own set of definitions in a domain specific language that complements the condition/action classes for that particular group.

As shown in FIG. 24, the preferred method includes block S302, which recites storing an initial state of the group at a database. Block S302 preferably functions to push, write, record, generate, create, and/or memorize a file relating to an initial state of the group as defined by its group definition and/or one or more group configurations. Preferably, block S302 can be performed at a database of the type described above with reference to FIG. 23. As noted above, the database can be integrated into a cloud manager or maintained at one or more discrete and/or remote locations. As noted above, a suitable database can include any device for storing data such as a mySQL database or an XML file. Block S302 preferably includes storing a record for each group, which can include at least group definitions and group configurations, group status, role(s), capacity/load, and/or any suitable operation information relating to the group or any portion thereof. Block S302 can additionally include storing a security key, token, or hash to securely identify each group on the computing cluster.

As shown in FIG. 24, the preferred method can include block S306, which recites receiving an instruction to start the group in a cloud telephony system at the first computer. Block S306 preferably functions to interface with a user to mediate the creation or generation of a group in a distributed network such as the computing cluster described above. Preferably, the group can include at least a definition (in a domain specific language) as well as a set of configurations that set forth conditions and actions applicable to the group. The group can further include a host type, roles for the host, an instance count, and/or an instance size. As noted above, each of these aspects of the group can be received and compiled at the first computer and stored on the database. Accordingly, a simple instruction from a user can be transmitted to the first computer. Preferably, block S306 includes receiving a stateless or RESTful instruction, thereby minimizing the complexity of interacting with the cloud telephony system.

As shown in FIG. 24, the preferred method can further include block S308, which recites from first computer, launching the group at a computing cluster. Block S308 preferably functions to push, post, generate, and/or create a group at the remote computing cluster, which as noted above, is preferably configured to host a cloud telephony system. The computing cluster of the preferred method can include one or more of a plurality of machines, groups of machines, states of machines, and/or any combination thereof. As noted above, suitable machines can be identical in setup or may alternatively be composed of a variety of systems such as web servers, voice over Internet protocol (VoIP) systems, media processors, load balancers, databases, proxy servers, caches, queues, and/or any suitable computing device and/or storage devices. As noted above, each machine in a group preferably has operation information available to interested parties, which can include machine status (e.g., booting, running, shut down, etc.), internal Internet protocol (IP) address, external IP, role (e.g., web server, VoIP, load balancer, media processor, etc.), capacity/load, and/or any suitable operation settings or information. As noted above, a group of machines preferably includes at least a group definition and a group configuration. Preferably, the group definition includes a domain specific language that permit the group/s to be compiled into group types by the first computer. Suitable group configuration attributes can include a condition class and/or an action class. Preferably, each of the group definition and group configuration are maintained statelessly, thereby permitting RESTful configuration, monitoring, and updating according to the principles set forth above.

Figure 25:
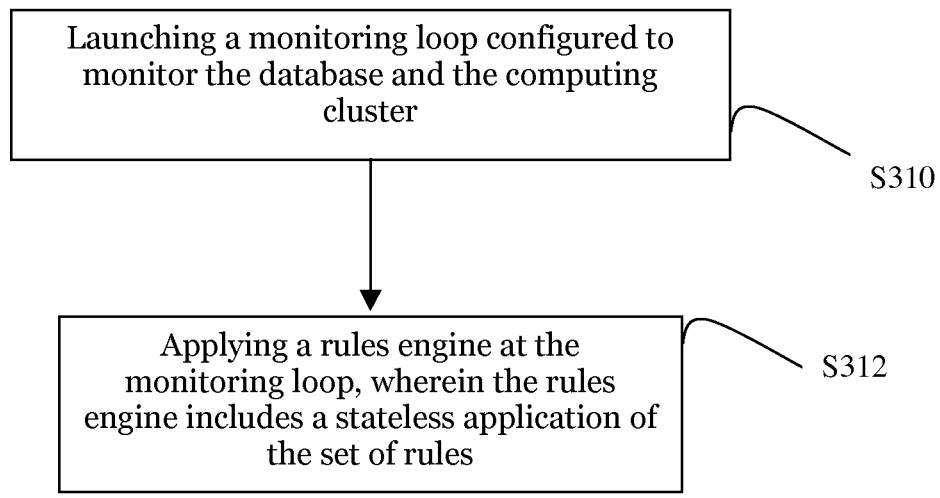
FIG. 25 is a block diagram depicting the method for managing groups in accordance with a variation of the preferred embodiment of the present invention.

As shown in FIG. 25, one variation of the preferred method can include launching a monitoring loop configured to monitor the database and the computing cluster in block S310 and applying a rules engine including a stateless application of the set of rules at the monitoring loop in block S312. Block S310 preferably functions to cause, create, generate, and/or launch a monitoring process that interacts with the group database and the computing cluster. Block S312 preferably functions to establish a set of procedures, processes, and/or applications for the monitoring loop to follow in a predetermined manner in response to one or more predetermined inputs. Preferably, the monitoring loop is an infinite loop running in a substantially stateless or RESTful manner, thereby permitting constant real time or near real time monitoring and/or updating of the group states with little or no data persistence, data storage consumption, data processing consumption, bandwidth loss, or degradation in system performance. As noted above, in one variation of the preferred method, each individual group has its own unique and dedicated monitoring loop. Alternatively, one or more monitoring loops can be configured to monitor one or more groups as determined by the user in establishing the initial state of the group.

Figure 26:
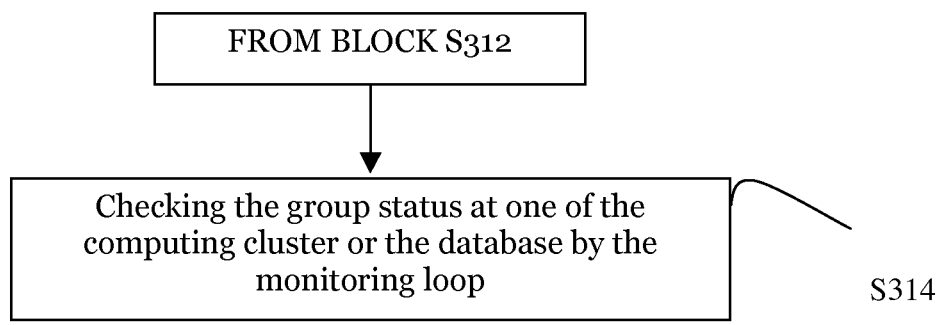
FIG. 26 is a block diagram depicting the method for managing groups in accordance with a variation of the preferred embodiment of the present invention.

As shown in FIG. 26, another variation of the preferred method can include block S314, which recites checking the group status at one of the computing cluster or the database by the monitoring loop. Block S314 preferably functions to provide the rules engine at the monitoring loop with the necessary data to determine whether the existing state of the groups at the computing cluster is consistent with or identical to a desired state of the group as stored at the database. In another variation of the preferred method shown in FIG. 27, block S316 recites adjusting the group status at the computing cluster by the monitoring loop in accordance with the rules engine in response to one of a change in state of the group at one of the database or the computing cluster. Block S316 preferably functions to change, alter, update, conform, and/or adjust an existing group status at the computing cluster to match that of the database using one or more of the set of rules in the rules engine. Preferably, block S316 is performed automatically and substantially simultaneously in response to a difference between the group state at the computing cluster and the database as determined in block S314.

Figure 27:
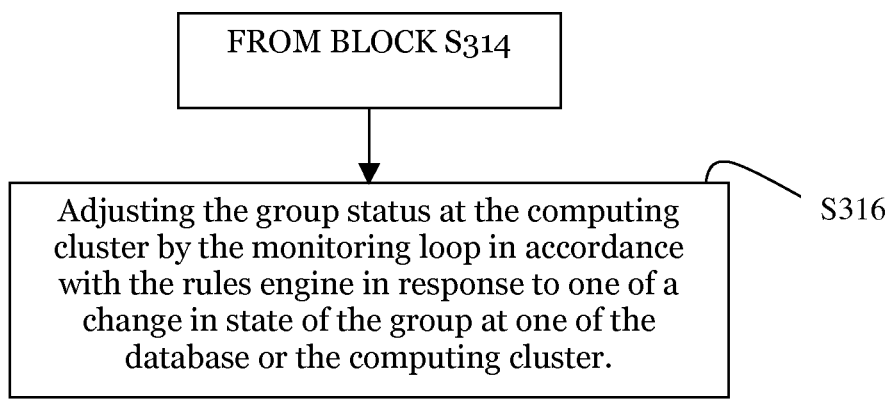
FIG. 27 is a block diagram depicting the method for managing groups in accordance with a variation of the preferred embodiment of the present invention.

As shown in FIGS. 26 and 27, variations of the preferred method can function to continuously and indefinitely control the state of the group at the computing cluster to match the desired state of the group as stored at the database. As described above, the group status can be generated and/or updated via the API to the database. In block S306, the matching group is launched at the computing cluster in the desired state. Block S314 preferably checks the actual status of the group in the computing cluster and, using the rules engine, compares the actual state of the group to the desired group state stored in the database. As noted above, the rules engine preferably includes a series of when/then rules or scripts, such that the monitor loop only takes action (then) in response to a predetermined set of conditions (when). In the example noted above, if the database indicates that a group is to be started, but the computing cluster indicates that no hosts have been booted in block S314, then the monitor loop directs the computing cluster to boot the desired hosts in block S316. Similarly, if one or more hosts are running but are not present in the load balancer as determined in block S314, then the monitor loop directs the computing cluster to transfer the hosts into the load balancer in block S316. As noted above, a preferred rules engine is substantially or entirely stateless such that the prior status of any group is not stored, maintained, or otherwise determinative of the present behavior of the monitor loop.

An alternative embodiment preferably implements the above methods in a computer-readable medium storing computer-readable instructions. The instructions are preferably executed by computer-executable components preferably integrated with a distributed, networked computing cluster with a plurality of machines and a configuration controller. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method comprising: at a telephony network platform system that includes a cloud manager, a database, and a monitor module, the cloud manager including a pub-sub messaging system, the cloud manager using the pub-sub messaging system for communication with a remote third-party Internet-based multi-tenant computing platform via the Internet, the multi-tenant computing platform being constructed to provide at least one machine group that includes a plurality of machines for implementing a cloud-based telephony platform that provides one of a plurality of telephony platform services including a voice communication service, a messaging communication service and a video communication service:

at the cloud manager, receiving a first user instruction to create a first telephony platform machine group that includes a plurality of machines of the remote Internet-based multi-tenant computing platform, the first user instruction being received from an outside system via a REST API of the cloud manager, the outside system being an external system of a user of the remote multi-tenant computing platform;

responsive to receipt of the first user instruction, the cloud manager storing a first machine group record in the database in accordance with the first user instruction, the first machine group record comprising a group configuration and a group definition, the group configuration comprising a set of rules, the group definition defining the machines of the first machine group, in a domain specific language, the first machine group record relating to an initial state of the first machine group as defined by at least one of the group definition and the group configuration, the initial state of the first machine group record specifying first telephony platform software for a first telephony platform service, the first telephony platform service being one of the voice communication service, the messaging communication service, and the video communication service;

the cloud manager establishing a cloud manager publication channel with the pub-sub messaging system, the pub-sub messaging system being constructed to provide the first telephony platform software via the Internet to each machine of the first machine group, establishing the cloud manager publication channel comprising:

the cloud manager storing a security key of the first machine group and a security key for each machine of the first machine group, the security key for each machine of the first machine group being supplied at boot time of the respective machine and provided to the cloud manger via the pub-sub messaging system, the security key of each machine being used to securely identify the machine;

at the cloud manager, receiving a second user instruction to start the first telephony platform machine group, the second user instruction being received from the outside system via the REST API of the cloud manager;

at the cloud manager and responsive to receipt of the second user instruction to start the telephony platform machine group, the cloud manager launching the first telephony platform machine group at the remote computing platform by using the pub-sub messaging system, launching the first telephony platform machine group comprising:

for each machine of the first telephony platform machine group:
encrypting the first telephony platform software of the first machine group record with the stored security key of the machine,
providing the encrypted first telephony platform software to the machine via the cloud manager publication channel,
wherein responsive to the machine decrypting the encrypted first telephony platform software by using the security key, the machine executes the first telephony platform software, the first telephony platform software being constructed to control the machine to provide at least a portion of the first telephony platform service;

at the cloud manager, the cloud manager controlling the monitor module to generate a monitoring loop to check status of the first telephony platform machine group at the remote computing platform, the monitor module comprising a rules engine for stateless application of the set of rules of the group configuration of the first telephony platform machine group;

the monitor module checking actual status of the first telephony platform machine group at the remote computing platform, and comparing the actual status with a desired state of the first telephony platform machine group as indicated by the first machine group record stored in the database, comparing the actual status with the desired state comprising: determining whether each machine of the first telephony platform machine group is executing telephony platform software specified by the first machine group record; and at the cloud manager, receiving a third user instruction to change operation of the machines of the first telephony platform machine group, the third user instruction being received from the outside system via the REST API of the cloud manager;

at the cloud manager and responsive to receipt of the third user instruction to change operation of the machines, the cloud manager updating the first machine group record in the database in accordance with the third user instruction, updating the first machine group record comprising: updating the first machine group record to specify second telephony platform software for a second telephony platform service, the second telephony platform service being one of the plurality of telephony platform services that is different from the first telephony platform service;

responsive to a determination by the monitor module that at least one machine of the first telephony platform machine group is executing the first telephony platform software and the first machine group record specifies the second telephony platform software, the monitor module adjusting the actual status of the first telephony platform machine group at the remote computing platform to match the desired state by using the rules engine to apply the set of rules of the group configuration, adjusting the actual status comprising:

for each machine of the first telephony platform machine group:
encrypting the second telephony platform software of the first machine group record with the stored security key of the machine,
providing the encrypted second telephony platform software to the machine via the cloud manager publication channel to replace the first telephony platform software with the second telephony platform software at the machine, the machine decrypting the encrypted second telephony platform software by using the security key of the machine and the machine replacing execution of the first telephony platform software with execution of the second telephony platform software to provide at least a portion of the second telephony platform service,
wherein responsive to the machine decrypting the encrypted second telephony platform software by using the security key, the machine executes the second telephony platform software.

2. The method of claim 1, further comprising compiling the group definition into an internal representation at the cloud manager.

3. The method of claim 1, wherein the set of rules comprises a condition class and an action class.

4. The method of claim 1, wherein the group configuration and the group definition are stateless.

5. The method of claim 1, further comprising the monitor module adjusting the desired state at the database in accordance with the rules engine in response to a change in the actual status of the telephony platform group at the remote computing cluster.

6. The method of claim 1, wherein the monitoring loop is an infinite loop.

7. The method of claim 1, further comprising:
the monitor module checking the desired state of the telephony platform group as indicated by the group record stored at the database; and
responsive to a determination by the monitor module that the desired state has been updated, the monitor module adjusting the actual status of the telephony platform group at the remote computing cluster to match the updated desired state by using the rules engine to apply the set of rules of the group configuration.

8. The method of claim 7, further comprising:
responsive to an API request to update the desired state, the cloud manager updating the desired state at the database in accordance with the API request.

9. The method of claim 1, wherein the monitor module accesses the second telephony platform software from the database.

10. The method of Claim 9, wherein the set of rules of the first machine group record includes a rule that when applied by the rules engine controls the monitor module to provide the encrypted second telephony platform software to each machine of the first telephony platform machine group responsive to a determination that sustained communication sessions of the first telephony platform service have ended.

11. The method of claim 10, wherein the first telephony platform software and the second telephony platform software are each constructed to control each machine of the first telephony platform machine group to publish a machine state notification of the machine to the monitor module via the Internet responsive to a change in a machine state of the machine, the machine publishing the machine state notification by using a publication channel of the pub-sub messaging system.

12. The method of Claim 11, wherein the first telephony platform software is replaced during operation of the first telephony platform service.

* * * * *